US006859207B2

(12) United States Patent
Nougaret et al.

(10) Patent No.: US 6,859,207 B2
(45) Date of Patent: Feb. 22, 2005

(54) METHOD AND APPARATUS FOR PRODUCING A COORDINATED GROUP ANIMATION BY MEANS OF OPTIMUM STATE FEEDBACK, AND ENTERTAINMENT APPARATUS USING THE SAME

(75) Inventors: Jean-Luc Nougaret, Rennes Cedex (FR); Takashi Totsuka, Chiba (JP); Kaoru Hagiwara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/823,441

(22) Filed: Mar. 30, 2001

(65) Prior Publication Data

US 2002/0093503 A1 Jul. 18, 2002

(30) Foreign Application Priority Data

Mar. 30, 2000 (JP) ........................................ 2000-095372
Mar. 26, 2001 (JP) ........................................ 2001-088013

(51) Int. Cl.$^7$ ................................................ G06T 7/20
(52) U.S. Cl. ........................................................ 345/474
(58) Field of Search ................................. 345/474, 958, 345/959

(56) References Cited

U.S. PATENT DOCUMENTS 5,710,894 A    1/1998 Maulsby et al.

FOREIGN PATENT DOCUMENTS

JP          8-30804          2/1996

OTHER PUBLICATIONS

Ground Control Field Commander's Handbook. Massive Entertainment. Version 1.61.*
Brogan et al., Group Behaviors for Systems with Significant Dynamics, 1999, Kluwer Academic Publishers, Autonomous Robots 4, pp. 137–153.*
Brogan et al., Group Behaviors for Systems with Significant Dynamics, 199, Kluwer Academic Publishers, Autonomous Robots 4, pp 137–153.*
Microsoft, Age of Empires Help File, Oct. 3, 1997, pp 1–11.*
Blumberg, Go with the Flow: Synthetic Vision for Autonomous Animated Creatures, 1997, ACM, pp 538–539.*
European Patent Office; "Partial European Search Report" for Application No. EP 01 30 3019; dated Mar. 31, 2003; pp. 1–5.

(List continued on next page.)

Primary Examiner—Mark Zimmerman
Assistant Examiner—Peter-Anthony Pappas
(74) Attorney, Agent, or Firm—Fitch, Even, Tabin & Flannery

(57) ABSTRACT

An apparatus is disclosed for producing an animation of a group including a plurality of members which are dynamically controlled. The apparatus includes a role assignment switchboard for assigning roles to the respective members of the group so as to achieve a layout specifying a particular group-level state; an optimum continuous controller for continuously determining the states of the respective members in a reference state in which the roles of the respective members are assigned by the role assignment switchboard; an optimum discrete role assigning unit for controlling the role assignment switchboard so as to perform the assignment of roles to the respective members in accordance with a command given from the outside and also in accordance with the current state of the group; and member state determining unit for determining the states of the respective members in accordance with a set of variables describing the dynamic characteristics of the respective members, a global disturbance, and interactions among the members.

2 Claims, 14 Drawing Sheets

OTHER PUBLICATIONS

Japanese Patent Office; "Notification of Reasons for Refusal"; Dispatch No. 094859; Dispatch Date: Mar. 25, 2003; pp. 1–7 (including three–page English translation of portions).

M. P. Gaupp et al.; "Using Adaptive Agents in Java to Simulate U.S. Air Force Pilot Retention"; *Proceedings of the 1999 Winter Simulation Conference*; Dec. 1999; pp. 1152–1159.

P. Heleno et al.; "Artificial Animals in Virtual Ecosystems"; *Computer Networks and ISDN Systems*; vol. 30, No. 20–21; Nov. 1998; pp. 1923–1932.

D. Liberzon et al.; "Basic Problems in Stability and Design of Switched Systems", *IEEE Control Systems Magazine*; Oct. 1999; pp. 55–70.

J. Eker et al.; "Design and Implementation of a Hybrid Control Strategy"; *IEEE Control Systems*; vol. 19, No. 4; Aug. 1999; pp. 12–21.

R. Grimaldi; "Chapter 13: Optimization and Matching"; Discrete and Combinatorial Mathematics; Addison Wesley, New York, 1999; pp. 591–627.

J. Funge et al.; "Cognitive Modeling: Knowledge, Reasoning and Planning for Intelligent Characters", *Siggraph 99* ; 1999; pp. 29–38.

J. Toner et al.; "Flocks, herds, and schools: A quantitative theory of flocking"; *Physical Review E* ; The American Physical Society; vol. 58; No. 4; Oct. 1998; pp. 4828–4858.

J. I. Nougaret et al.; "Coarse to Fine Design of Feedback Controllers for Dynamic Locomotion", *Visual Computer*; vol. 13; 1997; pp. 435–455.

D. Brogan et al.; "Group Behaviors for Systems with Significant Dynamics"; *Proceedings of the 1995 IEEE/RSJ International Conference on Intelligent Robots and Systems*; 1995; vol. 4, pp. 528–534.

M. Van De Panne et al.; "Reusable Motion Synthesis Using State–Space Controllers"; *Proceedings of Siggraph 1990*; Computer Graphics Proceedings, ACM Siggraph, 1990, pp. 225–234.

L. Brotman et al.; "Motion interpolation by optimum control", *Proceedings of Siggraph 88*; Aug. 1988; pp. 309–315.

C. W. Reynolds; "Flocks, Herds, and Schools: A Distributed Behavioral Model", *Siggraph '87*; Computer Graphics; vol. 21, No. 4; Jul. 1987; pp. 25–34.

J. La Salle; "Stability by Liapunov's Direct Method"; Academic Press, Inc.; 1961; pp. 33–34 and 56–73.

X. Tu et al.; "Artificial Fishes: Physics, Locomotion, Perception, Behavior"; Department of Computer Science; University of Toronto; (date unknown); pp. 1–8.

G. F. Franklin et al.; "Chapter 9: Multivariable and Optimal Control"; Digital Control of Dynamic Systems; Addison–Wesley, Menlo Park, California; 1998; pp. 359–420.

* cited by examiner

PERFORMANCE INDEX

NUMBER OF LOCAL INTERACTIONS

FIG.7

| MEMBER | ALGORITHM | N | $n_e$ | $Nn_e$ | COORDI-NATION | TOTAL/STEP | REAL-TIME |
|---|---|---|---|---|---|---|---|
| FISH | A2 | 6 | 6 | 36 | 8KFLOPS | 16KFLOPS | YES |
| AIRCRAFT | A2 | 6 | 11 | 66 | 14.6KFLOPS | 23KFLOPS | YES |
| BEE | A1 | 50 | 4 | 20 | 17MFLOPS | 16.8MFLOPS | RESTRICTIVE |
| BEE | A1 | 100 | 4 | 400 | 67MFLOPS | 68MFLOPS | NO | nz=20000 nz=100 nz=100 nz=20000 nz=39998 nz=100

OPTIMAL COST (SEMILOG SCALE)

NUMBER OF FRAMES

ROLE ASSIGNMENTS

METHOD AND APPARATUS FOR PRODUCING A COORDINATED GROUP ANIMATION BY MEANS OF OPTIMUM STATE FEEDBACK, AND ENTERTAINMENT APPARATUS USING THE SAME

BACKGROUND OF THE INVENTION

1. Field of the Invention

The present invention relates to a method and apparatus for producing an animation to represent in a quasi fashion the movement of a group including a plurality of members such as persons or animals, and more particularly, to a method and apparatus for controlling the movements of members as a group. The present invention also relates to an entertainment apparatus using such a method.

2. Description of the Related Art

Conventional computer graphic techniques can be classified into two categories: group animation and physically based animation.

Physically based animation refers to an animation which is produced in accordance with a physical principle such as a law of mechanics. More specifically, equations of motion (simultaneous nonlinear equations or differential equations) is determined according to Newton's law or Lagrange's law for each member. However, the cost of precisely simulating mechanical or physical motion is high. Therefore, in the art of information processing apparatuses, such as computers, or in the art of entertainment apparatuses, to which the present invention is applied, some simplification is generally performed to reduce the cost.

That is, in these fields of technologies, it is not necessary to build a physically accurate model, but equations of motion based on a quasi-physical model may be employed if the equations allow the motion of the respective members of interest to be determined in real time and if the resultant motion appears sufficiently natural.

(1) Group Animation to Represent Group Behavior

The research work by Reynolds has had a profound impact upon the art (C. W. Reynolds, "Flocks, Herds, and Schools: A Distributed Behavioral Model", Proceedings of Siggraph 87, July, 1987, 25–34). After his research work, animation of a group of birds, fishes, or animals can be realized by means of programming independent members of the group. By adjusting parameters associated with the behavior of each member, it is possible to control the behavior in a discrete fashion. However, when the group is viewed as a whole, most of the group behavior occurs spontaneously.

Tu and Terzopoulos have produced a more realistic animation of a group including a plurality of members by improving the reality of the group and the senses by simulating biomechanical behavior (X. Tu and D. Terzopoulos, "Artificial Fishes: Physics, Locomotion, Perception, and Behavior", Proceedings of Siggraph 94, July, 1994, 24–29). This pioneering research work indicated that the behavior of a group of fishes or animals can be synthesized in a more natural fashion by employing a combination of stimulus-response rules.

Receiving a stimulus from artificial intelligence technology, Funge, Tu, and Terzopoulos have proposed and demonstrated a very elegant framework which allows the representation of perceptive behaviors of members of a group (J. Funge, X. Tu, and D. Terzopoulos, "Cognitive Modeling: Knowledge, Reasoning and Planning for Intelligent Characters", Proceedings of Siggraph 99, July 1994, 29–38). They have attained their objective in that artificial life and the behavior thereof are animated.

(2) Dynamic and Physical Group Animation

Dynamic and physical animation has great problems in stability and controllability. The problems become serious when groups include a large number of members. The motion of group members is very complicated, and it has been thought that it is very difficult to mathematically represent the complicated motion. However, two physicists, Toner and Tu, have recently explained using a mathematical model how coordinated group behavior occurs spontaneously (J. Toner and Y. Tu, "Flocks, herds, and schools: A Quantitative Theory of Flocking", Physical Review Letters, Vol. 58, 1999). A profound understanding of the motion of a group including a plurality of members is important. In particular, in the art of computer animation, the development a high-efficiency method of dynamically controlling a group including a plurality of members is required.

Brogan and Hodgins have investigated the behavior of a group with significant dynamics and have presented their opinion about the complexity of the problem (D. Brogan and J. Hodgins, "Group Behaviors for Systems with Significant Dynamics", Proceedings of the 1995 IEEE/RSJ International Conference on Intelligent Robots and Systems, Vol. 4, 528–534; D. Brogan and J. Hodgins. "Group Behaviors for Systems with Significant Dynamics", Autonomous Robots 4(1), 1997, pp. 137–153). That is, they have pointed out that motion of individual members and local interactions make it difficult to control the group as a whole and that a combination of local knowledge and global knowledge is required to efficiently control the individual members.

The objective of the research work by Brogan and Hodgins was not to provide a technique for animation but to provide a technique which may be applied to the art of robotics in which realistic equations of motion can be employed so that a realistic group behavior is represented by means of dynamic control. Therefore, this technique is not assumed to be applied to technical fields such as animation in which it is required to simplify the motion of the individual members, depending upon the specific purpose.

Furthermore, in the conventional techniques described above, control factors are adjusted experimentally and manually, and automatic adjustment of the control factors has not yet been achieved.

SUMMARY OF THE INVENTION

In view of the above, it is an object of the present invention to provide a method and apparatus for producing an animation of a group including a plurality of members whose behavior is dynamically controlled. It is another object of the present invention to provide an entertainment apparatus which uses an animation produced by the above method.

According to an aspect of the present invention, to achieve the above objects, there is provided a method of producing an animation of a group including a plurality of members, the method comprising a continuous processing step for determining the states (such as a location and a dynamic state) of the respective members at each time step in accordance with, predetermined dynamic characteristics of the respective members, and a discrete processing step for accepting, from the outside, a command specifying the overall state (such as a shape or a dynamic state of the group) to be achieved for the group and assigning roles to the respective members of the group in accordance with the overall state specified by the command. In the method, if new roles are assigned to members in the discrete processing step, the dynamic states of the respective members are adjusted, in the continuous processing step, in accordance with the assigned new roles.

According to another aspect of the present invention, there is provided an entertainment apparatus comprising an input unit for inputting a command issued by a user or an operation performed by a user, an executing unit for executing a prestored entertainment program in accordance with the command or operation, and an output unit for outputting the result of the execution of the entertainment program. In the apparatus the executing unit produces an animation of a group including a plurality of members using the above-described method according to the present invention, and outputs the produced animation to the output unit so as to display the animation.

BRIEF DESCRIPTION OF THE DRAWINGS

FIG. 7 is a table illustrating the evaluation results in terms of the stability and the calculation load during a game, for the algorithm according to the present invention;

DESCRIPTION OF THE PREFERRED EMBODIMENTS

Figure 1:
FIG. 1 is a schematic diagram illustrating an example of an animation produced using a method of controlling the movement of members as a group according to the present invention.

With reference to the accompanying drawings, embodiments of a method and apparatus for producing an animation of a group including a plurality of members whose motion is coordinated by means of dynamic control according to the present invention, so that the members behave in a desired fashion as a group, and also an embodiment of an entertainment apparatus using the method are described.

(A) Method and Apparatus for Producing Group Animation

A typical example of cooperative group behavior is the systematic or coordinated behavior of a group of fishes or animals. However, the group behavior appearing at the surface is not always controlled perfectly, as is the case in a group falling down from the top of a cliff at full speed.

In the natural world, when there is no control system which controls the entire group, the relative motion of each member of the group is tightly constrained by local interactions. In many cases, local interactions occur not as an objective action but as a by-product.

In the present embodiment, by way of example, a group of fishes or animals is animated by means of a dynamic simulation and on the basis of a physical model. Herein it is assumed that the intrinsic characteristics of the group are poorly controlled and thus the group behaves as a potentially unstable dynamic system. In the present embodiment, taking into account the above, the physical characteristics associated with the motion of the members of the group are reflected in the animation.

(A-1) Motivation for Use of Dynamic Group Motion

In the present invention, the term "dynamics" is used to describe a general dynamic system. This is applied not only to a physical model or a quasi-physical model but also to a model which describes the behavior by mathematical expressions such as a combination of differential equations and finite difference equations including a discrete event component in a finite state machine or the like.

In computer animation, the application of dynamic characteristics eliminates a lot of tedious manual tasks required in synthesis of the motion of a group including a very large number of members. If the motion of a group including a plurality of members is represented on the basis of a model rather than trajectories, it becomes possible to easily make modifications to adapt to various requirements at the design stage. That is, even if the environment or the scenario is modified many times, the use of a model allows trajectories to be easily calculated for the modified environment or scenario.

In interactive animations and video games in which an infinite number of events can occur in response to unpredictable operations performed by a user, employment of the group animation based on the dynamic characteristics is very useful. In order that the motion of a group is controlled by a scenario or a game player without falling into a confused and uncooperative state, but intentional or forced coordination, rather than spontaneous coordination, among the group members is required.

(A-2) Main Improvements

If animation of a group including a plurality of members on the basis of independent behaviors of the individual members is attempted, it is difficult to control the group in accordance with a given scenario. In order to form a group in a desired fashion with a required precision at a correct time, it is effective to give a command to control the group as a whole with coordination. To this end, the following improvements are required.

First, high-precision coordination among the individual trajectories is required to realize systematic behavior. Essentially, this is a problem of continuous control. To the above end, it is desirable to link, to a continuous world, a program or an inference engine operating according to rules based on the discrete behaviors and empirically obtained knowledge, more tightly than is currently linked. Second, problems such as instability and uncontrollability intrinsic to dynamic systems often occur in physical animations. In the present embodiment, in view of the above, the following improvements are made.

1. Unified Rule for Obtaining Coordinated Motion of a Group

The concept of a state-space layout is introduced herein to provide a unified fundamental expression to specify the motion or the state of a group as a whole. Furthermore, it is proposed herein that when a dynamic state becomes diverged, a hybrid rule consisting of continuous and discrete processes is employed to efficiently control the dynamic state into a stable state.

2. Coordination Algorithm at Run Time

We herein propose a coordination algorithm for controlling individual members of the group frame by frame instead of treating them as a mass. This algorithm exerts high performance in real time when being applied to a small group including a small number of members.

3. Guideline for Adjustment of Dynamic Model

The optimum performance of this coordination algorithm is assured for linear dynamic characteristics. For complicated dynamic characteristics, a guideline is presented for adjustment of the dynamic model to handle non-linearity and maintain high performance.

4. Demonstration

FIG. 1 illustrates an example of an animation which has a high dynamic level and thus which could not be achieved by any other method because of the problems of instability and uncontrollability. In FIG. 1, the result of the pioneering work by Tu and Terzopoulos (X. Tu and D. Terzopoulos, "Artificial Fishes: Physics, Locomotion, Perception, and Behavior", Proceedings of Siggraph 94, July, 1994, 24–29) is herein reproduced by the technique according to the present invention. Herein, coordinated motion of a group is realized in an animation such that the group behaves systematically with high-accuracy dynamic characteristics. Thus, the group is maintained in a coordinated form without falling into a diverged state regardless of a disturbance. In the example shown in FIG. 1, a group of fishes having physical characteristics moves against the flow of water, and the group of fishes is illuminated with light.

(A-3) Problems to be Solved

In the present embodiment, the group coordination is separated as an intermediate layer between dynamic members and the interactive scenario. In the coordination according to the present embodiment, roles and control commands are issued to the respective members in response to a given group-level command so as to control the members to form a group in a desired fashion.

A first assumption made in the present embodiment is that a command specifying a group-level state can be issued as a layout command wherein the layout refers to a combination of operating points in a state space. Before describing the concept of the layout, it is first described that a command to control members to form a group can be described by one of the methods listed below or one of various other methods:

(a) A combination of labeled or non-labeled target locations described globally, locally, or on a frame-by-frame basis;

(b) A verbatim description of the manner of forming a group;

(c) Redistribution map of the member density in a particular scene; and (d) Specifying a dynamic level by a velocity vector.

In order to illustrate the effectiveness of the above methods, the manner in which the group changes in the state space with time is described below. Herein, the term "group" is used to describe a set of members whose motion variables are gathered into corresponding state vectors.

A member state vector $x_n^i$ with a height (vector size) of $n_e$ includes all variables at a time step n, wherein the variables include a variable representing the degree of freedom of a member i, first derivatives which represent the dynamic state thereof, variables representing physical and quasi-physical states, and the internal state of motion. Member state vectors are combined together into a single state vector $X_n = [x_n^1, x_n^2, \ldots, x_n^N]^T$ with a height of $N \cdot n_e$ to represent the state of the entire group. In this technique, the layout is not directly linked either to the respective individual members or the target layout, but the layout represents the distribution of non-labeled operating points for providing blind assignment to a group as a whole, That is, the layout is given by a vector $X_{ref} = [x_{ref}^1, x_{ref}^2, \ldots, x_{ref}^N]^T$ (200 in FIG. 2).

To realize the target layout, roles of members are assigned by a role assignment switchboard (201 in FIG. 2) by rearranging the target and assigning roles to the individual members. Herein, this is represented by $\pi_n \cdot X_{ref}$ where the $N \cdot n_e \times N \cdot n_e$ matrix $\pi_n$ represents a role assignment at time n, that is, a bisection between the target and the members (R. Grimaldi, "Discrete and combinatorial mathematics", Addison-Wasley, New York, 1999).

Such a matrix expression is very convenient and will be used in the remaining part of the description based upon linear algebra. However, in some cases, a simple mapping table can function well. Therefore, in practical systems, the matrix expression is not necessarily required. For example, the target assignment for members 1, 2, 3, 4, and 5 (selection of possible 5!=120 bisections) can be described as follows:

$$\pi_n \cdot X_{ref} = \begin{bmatrix} X_{ref}^1 \\ X_{ref}^4 \\ X_{ref}^2 \\ X_{ref}^3 \\ X_{ref}^5 \end{bmatrix} \quad (1)$$

-continued $$= \begin{bmatrix} \begin{bmatrix} 1 & 0 & 0 \\ 0 & 0 & 0 \\ 0 & 0 & 1 \end{bmatrix} & 0 & 0 & 0 & 0 \\ 0 & 0 & 0 & \begin{bmatrix} 1 & 0 & 0 \\ 0 & 0 & 0 \\ 0 & 0 & 1 \end{bmatrix} & 0 \\ 0 & \begin{bmatrix} 1 & 0 & 0 \\ 0 & 0 & 0 \\ 0 & 0 & 1 \end{bmatrix} & 0 & 0 & 0 \\ 0 & 0 & \begin{bmatrix} 1 & 0 & 0 \\ 0 & 0 & 0 \\ 0 & 0 & 1 \end{bmatrix} & 0 & 0 \\ 0 & 0 & 0 & 0 & \begin{bmatrix} 1 & 0 & 0 \\ 0 & 0 & 0 \\ 0 & 0 & 1 \end{bmatrix} \end{bmatrix} \begin{bmatrix} X_{ref}^1 \\ X_{ref}^2 \\ X_{ref}^3 \\ X_{ref}^4 \\ X_{ref}^5 \end{bmatrix}$$

Furthermore, in the present embodiment, the optimum hybrid feedback problem is solved as follows:

(i) When a set of N members is given, the dynamic characteristics of the respective members and the conditioned responses linked to one another are collectively represented by a nonlinear mapping f as follows:

$$X_{n+1} = f(X_n, U_n) \quad (2)$$

(ii) A layout is defined for the group as a target state in the state space $X_{ref}$ in accordance with a command issued by a user or in accordance with a game scenario. That is, the layout is specified on-the-fly.

(iii) A coordinated control $U_n = g(X_n - \pi_n \cdot X_{ref})$ is determined which allows formation of a group directed to the layout with the optimal performance (tradeoff between the time response and the energy consumed by the members). This reduces to a hybrid (continuous-discrete) problem described below;

(iii-a) Continuous Part: $X_n$ is driven toward $\pi_n \cdot X_{ref}$ using the control $U_n$ while minimizing a trade-off function J between particular energy and time. Instead of the function J representing the integral cost, an evaluation function in a quadratic form in the optimal regulator (LQ) problem may also be employed.

(iii-b) Discrete Event Part; Replacement of roles assigned to members is performed if it is determined that role replacement of $\pi_n$ results in an improvement in performance (for example, a reduction in the cost function J). More specifically, the cost J required to maintain the present roles of the individual members and the cost J* required to replace the roles among K members having the lowest performance, which will be described later, are calculated and compared with each other to determine whether the replacement of roles results in an improvement in performance. In the case where the total number N of members is small, K may be selected to be equal to N. However, when N is large, replacement of roles is performed only among K members, where K<N.

In the above-described optimum hybrid feedback technique according to the present invention, the problem of the group coordination required to achieve group-level control is intentionally separated from a large number of other problems in the group animation. On the assumption that dynamic effects are dominant, the dynamic effects are formulated on the basis of the viewpoint of the dynamic system and the control thereof, and individual members are separated from a high-level layer (planning and recognition) widely used in multiagent or cooperative robotics on the basis of IA driving. However, note that the separation does not mean inhibition of use of the layer related to the system.

Figure 2:
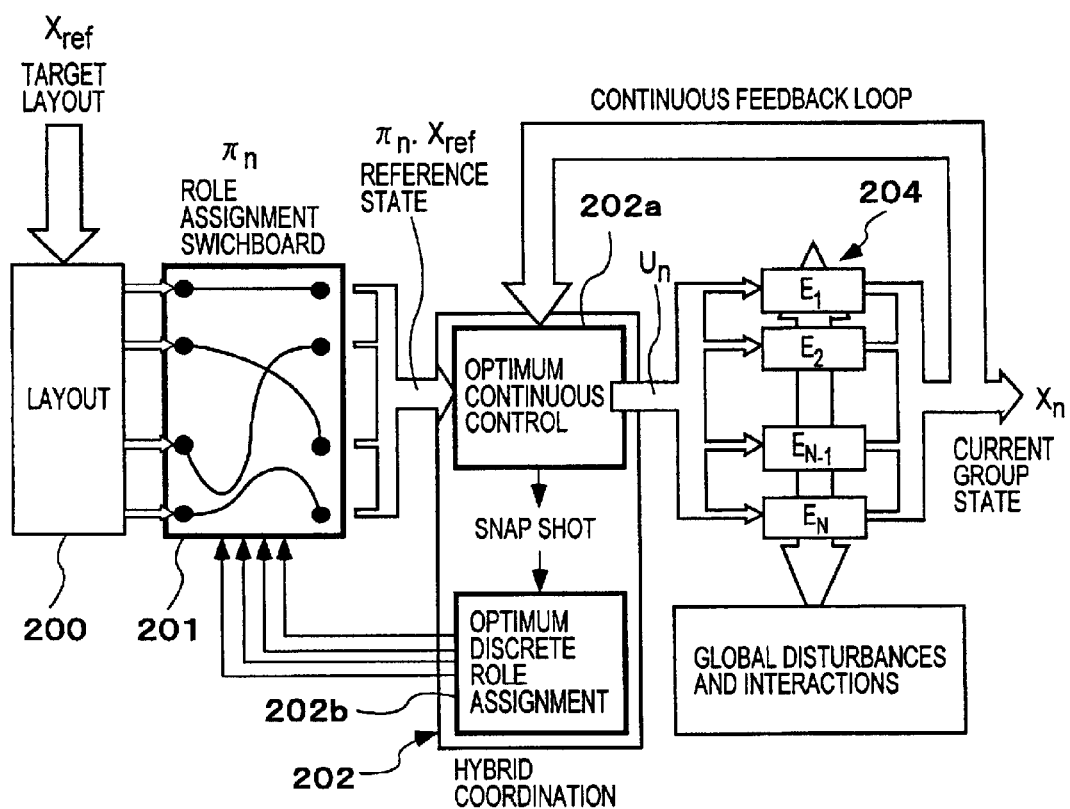
FIG. 2 is a block diagram illustrating an embodiment of a system for performing optimum hybrid feedback control according to the present invention.

FIG. 2 illustrates, in block diagram form, an example of a system for realizing the optimum hybrid feedback control according to the present invention. This system includes the role assignment switchboard 201, a hybrid coordination processor 202, and a member state determinator 204.

In accordance with a layout 200 specifying a particular group-level state which has been set in accordance with a request given from the outside, the role assignment switchboard 201 assigns roles required to achieve the layout 200 to the respective members.

The hybrid coordination processor 202 includes an optimum continuous controlling unit 202a and an optimum discrete role assigning unit 202b. The optimum continuous controlling unit 202a performs continuous feedback control, in accordance with the current group state, in the reference state in which the roles have been assigned by the role assignment switchboard 202 to the respective members, thereby continuously determining the states of the respective members. The optimum discrete role assigning unit 202b controls the role assignment switchboard 201 so that the roles of the members are reassigned at predetermined times, in response to an external command, or depending upon the present state (snapshot) of the group.

A member state determinator 204 determines the states of the respective members from a set of variables Ei describing the dynamic characteristics based on the states of the respective members determined by the optimum continuous controlling unit 202a, taking into account a global disturbance and interactions among the members, thereby determining the state of the group at the current time.

In the hybrid coordination process performed by the system shown in FIG. 2, taking into account the internal dynamic characteristics of members by introducing the concept of encapsulated members is important in designing of the feedback control. The coordination acts as a clutch between the interactive scenario and members, and the group is treated not as a black box but as a white box (model having a known structure).

The hybrid coordination process shown in FIG. 2 makes it possible to realize an interface between discrete planning and continuous dynamic characteristics via coordination between discrete motion and continuous motion.

Figure 3:
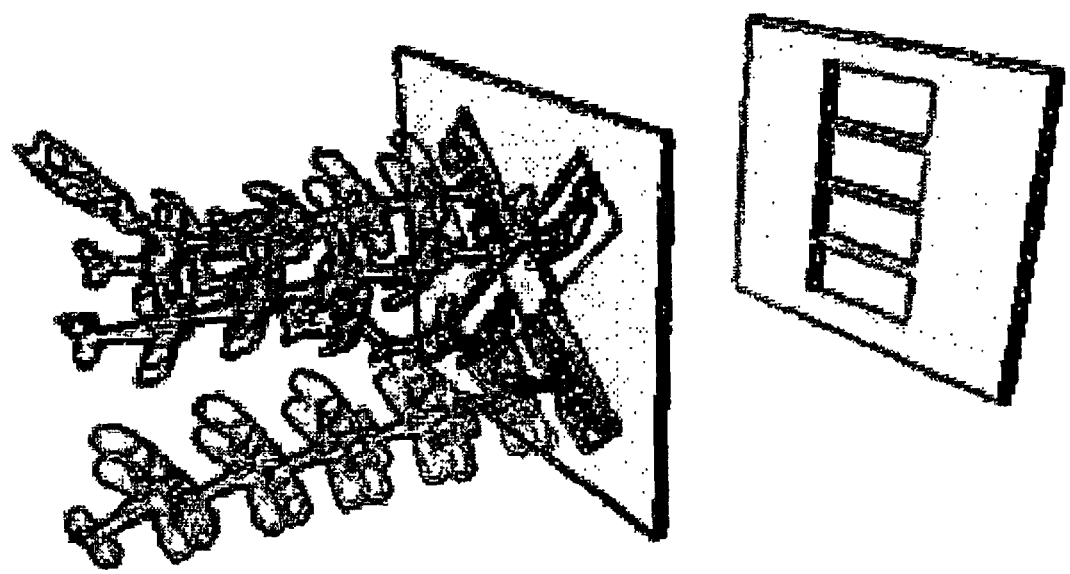
FIG. 3 is a schematic diagram illustrating another example of an animation produced using a method of controlling the movement of members as a group according to the present invention.

In many cases, the hybrid coordination process according to the present invention can be advantageously used. FIG. 3 illustrates one example. In the example shown in FIG. 3, a large number of airplanes fly as a group, in which pilots are required to fly their airplanes in coordination with each other. In this case, because the continuous feedback control becomes more dominant than the discrete determinations, it is difficult to represent the flights on the basis of conventional synthesis rules. The coordinated flight animation shown in FIG. 3 will be described in further detail later.

(A-4) Theoretical Background

The present invention is based upon the state space approach (disclosed in M. van de Panne, E. Fiume, and Z. G. Vranesic, "Reusable Motion Synthesis Using State-Space Controllers", in Proceedings of SIGGRAPH 1990, Computer Graphics Proceedings, ACM SiGGRAPH, 1990, 225–234) and also based upon the response feedback control.

Furthermore, a plurality of members are simultaneously controlled within a linear optimal control framework (disclosed in L. Brotman and A. Netravali, "Motion interpolation by optimum control", in Proceedings of Siggraph 88, August 1988, 309–315) wherein the control of the plurality of members includes replacement of roles assigned to the respective members.

From a theoretical viewpoint, the method according to the present invention is characterized by the hybrid control processing consisting of time-sampled continuous processing and discrete event processing, which are combined together and related to each other.

(A-4–1) Hybrid System and Hybrid Control

More particularly, this system is a so-called switched system including a group of continuous time subsystems which are set in correspondence with specific role assignments and also including a rule of coordinating the switching (role replacement) among the subsystems. The field of such a hybrid system is interdisciplinary and is at the boundary between control technology and computer science. Applications of the hybrid system are expanding into other fields such as automobile, electrical power supply, aircraft, and traffic control technologies (Special Issue on Hybrid Control Systems, IEEE Control Systems Magazine, 19(4), August 1999) in which themes of animations of interest include a collision, traffic, etc.

(A-4–2) Coordination of State-Space Trajectory

Controlling a group including a plurality of members such that the group has a desired form can be regarded as a problem of feedback control. The dynamic characteristics of a group involve not only conditioned responses and interactions (for example, instinctive behaviors of a group) but also many other events related to one another (for example, controlling of machines, muscles, and motors). Such a system is generally represented by a nonlinear mapping f with a combination of state variables. In the present embodiment, the group as a whole is regarded as a dynamic system and formulated. The formulation is then applied to the group animation.

In the present embodiment, the formulation of the coordinated motion of the group reduces to finding an admissible control set $\{U_{n0} \ldots U_{\infty}\}$ which minimizes the performance index $J(\{U_{n0} \ldots U_{\infty}\}, \{X_{n0} \ldots X_{\infty}\})$ constrained by a particular evaluation condition or by Equation (3) descried below.

$$\forall n \in [n_0 \ldots \infty]: X_{n+1} = f(X_n, U_n) \quad (3)$$

Although infinity is employed in Equation 3, the actual settling time (the time required for the state variables to settle within ±5% around the target values) can be generally reduced to an arbitrary value by increasing the control level.

In this nonlinear optimization problem, the processing of trajectories and inputting of tasks are required over the period of time $[1 \ldots \infty]$.

In applications to interactive animations, global searching is impossible and thus it is necessary to perform a process at each time step. For the above reason, a closed control rule $U_n = g(X_n)$ is required to convert the optimization problem into an optimum feedback problem, wherein g is a nonlinear mapping.

It will be useful to discuss here the treatment of nonlinearity based on linear design before discussing the nonlinear control (J. Slotine and W. Li, "Applied Nonlinear Control", Prentice Hall, 1991, 461 pages). This approach is well known to those skilled in the art, and it has been established on the basis of a reliable theory. For example, gain scheduling taking into account groups to be switched based on a linear model is described in D. A. Lawrence and W. J. Rugh, "Gain Scheduling Linear-Dynamic Controllers for a Nonlinear Plant", (Automatic, 31(3), 1995, pp. 381–390, and robust control in which nonlinearity is reduced to a disturbance is described in K. Zhou, "Essentials of Robust Control", (Prentice Hall International, 1998.

The above approach is a practical choice in the art of animation technology. That is, in virtual worlds, it is reasonable to manually build a dynamic model such that it behaves well. It is interesting to note that two physicists, Toner and Tu, who have proposed the mathematical theory of producing a group, have both employed similar two-step approaches in which linear approximation is performed first and then nonlinearity is taken into account (J. Toner and Y. Tu, "Flocks, herds, and schools; A Quantitative Theory of Flocking", Physical Review Letters, Vol. 58, 1999). The extraction of nonlinearity and the separate treatment thereof bring the problem back to the field of linear feedback control theory. Thus, it is assumed herein that the dynamic characteristics of a natural system can be represented by a set of matrices A and B as described below.

$$X_{n+1} = AX_n + BU_n \quad (4)$$

where the matrix A can be represented in the following form (the matrix B can also be representing in a similar form):

$$A = \begin{bmatrix} [E_1] & & & \\ & 0 & & 0 \\ & & [E_2] & \\ & 0 & & 0 \\ & & & & [E_N] \end{bmatrix} \Big\} Nn_a$$

$$\underbrace{1\ 4\ 4\ 4\ 4\ 2\ 4\ 4\ 4\ 4\ 3}_{Nn_e}$$

$$A' = \begin{bmatrix} [E_1] & & & \\ & 0 & & \\ & & [E_2] & \\ & [c_{ij}] & & 0 \\ & & & [E_N] \end{bmatrix}$$

Square matrices $E_i$ of order of $n_e$ appearing on the diagonal line of the matrix A represent the dynamic characteristics of the respective members. On the other hand, elements $C_{ij}$ lying off the diagonal line may be used to represent "natural" couplings among the members (due to, for example, the instinct of the group). Such a conditioned response is hard-wired and embedded at a low level in the dynamic characteristics.

In another embodiment, elements of the matrix B may be used to identify a command which is issued to a single member but which can influence a plurality of members and to share the same motivation among subgroups.

The fundamentals of linear optimization control and linear quadratic (LQ) synthesis (G. F. Franklin. J. D. Powell, and M. Workman, "Digital Control of Dynamic Systems", Addison Wasley, 1998) are discussed below. The multivariable optimization control rule g can be given by a matrix gain G which minimizes a performance index (which will be described below) represented by the state-space trajectory of the feedback system:

$$J = \frac{1}{2} \sum_{n=n_e}^{\infty} X_n^T Q X_n + U_n^T R U_n \qquad (6)$$

Because J has a quadratic form, a local minimization condition is required. This condition is sufficient to achieve a global minimum value. This evaluation criterion has a fixed structure and provides to a designer a means for adjusting the dynamic behavior by matrices Q and R while making a compromise between the response time of a selected state variable and the performance level (energy) of a process.

In the linear case, Riccati's equation (RE) is obtained by solving the minimization problem under constrained conditions by means of Lagrange's method of undetermined multipliers:

$$S_n = A^T[S_{n-1} - S_{n+1}B(R + B^T S_{n+1} B)^{-1} B^T S_{n+1}]A + Q \qquad (7)$$

In order to solve Riccati's equation, it is required to apply Equation (7) starting from the end point in a reverse direction along the time axis so as to obtain a time-varying control rule (G. F. Franklin, J. D. Powell, and M. Worman, "Digital Control of Dynamic Systems", Addison Wesley, 1988). Fortunately, it is known that the time-varying control rule quickly becomes stable, and the time-varying control rule can be well approximated by increasing n toward ∞. Thus, we can obtain a steady state version of Riccati's equation (ARE) to be considered, as described below:

$$S_\infty = A^T[S_\infty - S_\infty B(R + B^T S_{2 8} B)^{-1} B^T S_\infty]A + Q \qquad (8)$$

It is generally impossible to obtain a solution in a closed form for Equation (8) except for very simple cases. Thus, a numerical approach is employed at this stage. In Section (A-8), the eigenvalue expansion procedure which is widely employed in various CAD packages used in the design of control systems will be briefly described. If $S_\infty$ is determined, the optimum feedback rule is given as follows:

$$G = [R + B^T S_\infty B]^{-1} B^T S_\infty A \qquad (9)$$

The control gain G is a perfect matrix, that is, a multivariable controller which performs coordination taking into account coupling among the members and which minimizes the evaluation criterion at the group level. In contrast, a diagonal matrix or a block diagonal matrix controls the respective members independently.

(A-4-3) Coordinated Response to Discrete Events

In the above discussion, it is assumed that the initially assigned roles are valid, that is, n, $\pi_n = \pi_0$ over a period in which a particular layout is given. However, such a stable state is not realistic in time-varying environments which often occur in interactive games. In order to achieve effective coordination in a group, it is required to replace roles between members to compensate for various events and factors, whenever there is an opportunity to perform replacement. The opportunity for role replacement can occur when one of the conditions described below is met. Note that, the role replacement opportunity is not limited to those described below:

(a) Reduction in run-time performance due to a conflict between the nonlinear dynamics and the linear assumption;

(b) Addition or removal of a member to or from a group, which causes necessity for on-the-fly rearrangement of a layout; and (c) Occurrence of a discrete event such as a usual collision or non-modeled uncertainty in a time-varying environment.

In addition to the opportunities described above, replacement of roles may also be performed when a command is issued by a user or by a scenario to generate a new group, or when a change in the number of members occurs, or otherwise when the motion of members is affected by an obstruction or a collision.

In practical application to an animation, it is required to determine the states or locations of the respective members frame by frame. However, the assigned roles may be maintained over a plurality of frames, and replacement of roles may be performed only when the degree of necessity for the replacement becomes very high. In this case, it is required to strictly define the conditions which should be met to perform the role replacement, Furthermore, in this case, the evaluation or comparison of candidates to determine K members to be replaced in roles is inhibited or K is set to a small value over a period between events which can trigger the role replacement.

Figure 4:
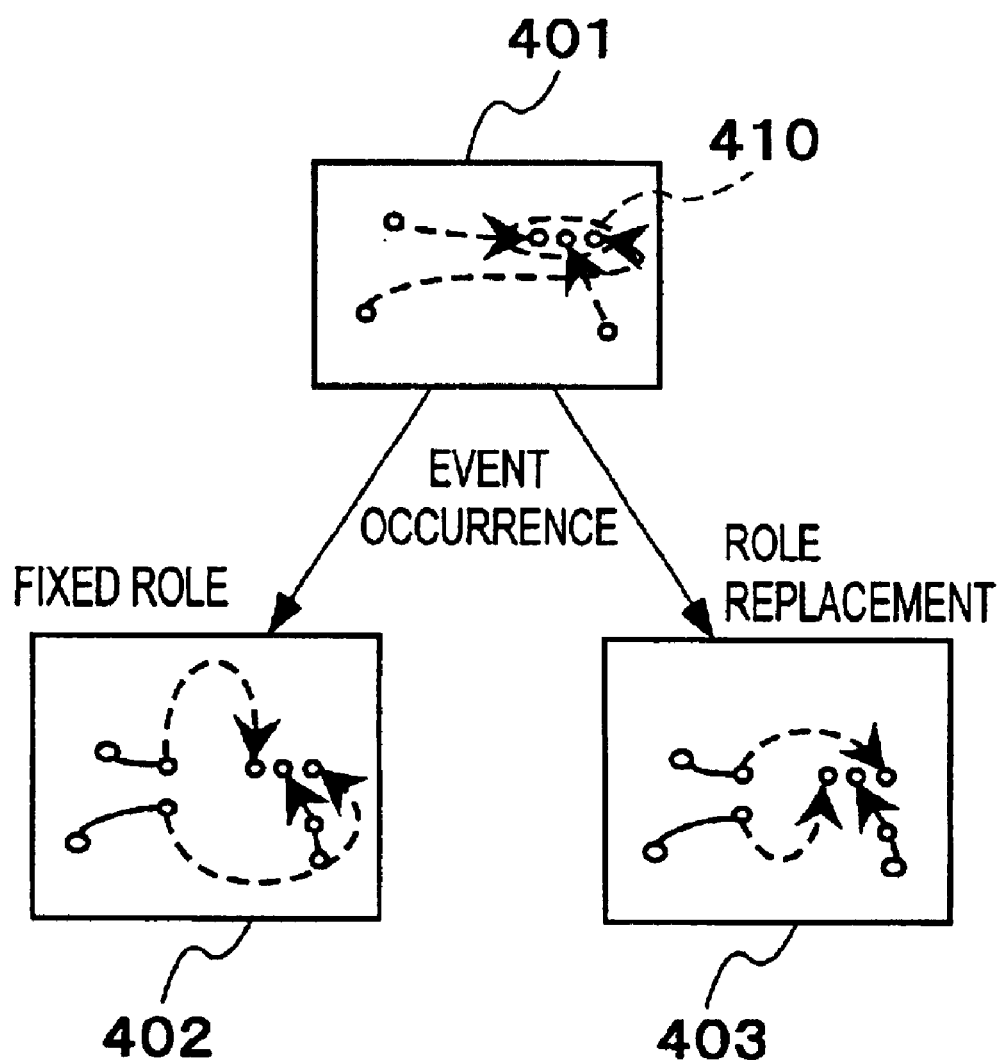
FIG. 4 is a schematic diagram illustrating an example of role replacements according to the present invention, wherein changes in the trajectories in the state space are shown for a group including three members.

The effects of replacement of roles are described below with reference to FIG. 4. FIG. 4 illustrates trajectories in the state space for a group including three members. In FIG. 4, when an event occurs in an initial state space 401 in which a target layout 410 has been set in advance, if replacement of roles is performed, the state space 401 is changed to a state space 403. However, if replacement of roles is not performed, the initial state space 401 becomes equal to the state space 402.

The assignment of roles is performed in accordance with a state snapshot. This becomes possible because of a significantly important theorem of optimum linear control theory which is described below. That is, the cost required to drive a dynamic system into a target state $n \cdot X_{ref}$ can be estimated as follows:

$$J = [X_n - \pi_n \cdot X_{ref}]^T S_\infty [X_n - \pi_n \cdot X_{ref}] \qquad (10)$$

The role replacement, that is, alternative bijections (k)/ k=1 . . . n! between members and the target can be evaluated and compared with one another by numerically evaluating the evaluation gains obtained by the respective options thereby evaluating the degrees of acceleration of the convergence toward the specified target achieved by the respective options. This is illustrated in further detail below with reference to FIG. 5.

Figure 5:
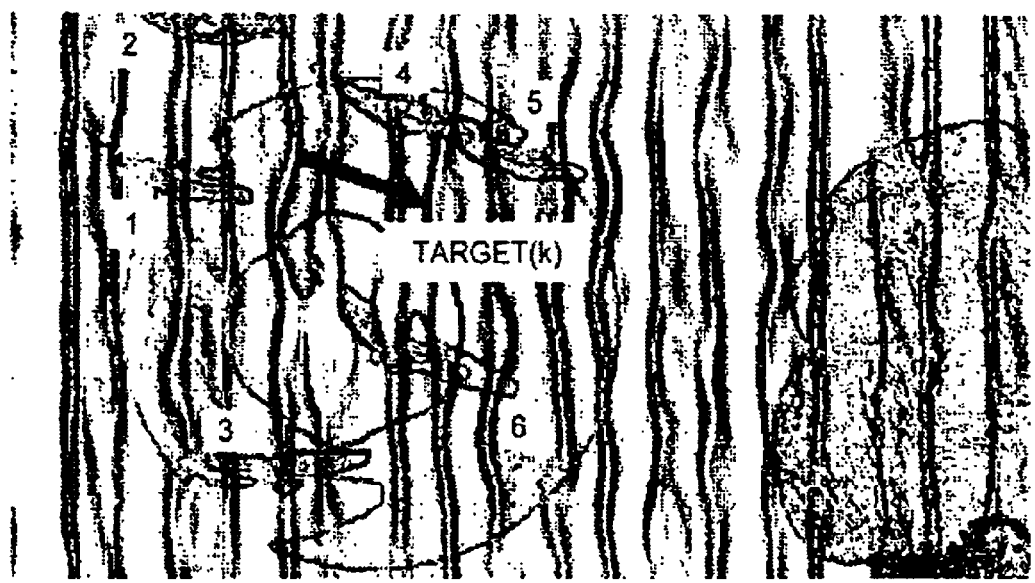
FIG. 5 is a schematic diagram illustrating an example of role replacements according to the present invention.

In the example shown in FIG. 5, the members are ranked in accordance with the ease of reaching the targets of the members by estimating the integral cost $J_i = [x_n^i - x_{ref}^i]^T Q[x_n^i - x_{ref}^i] + (u_n^i)^T R u_n^i$. Herein, $J_i$ is approximated by $J_i = [x_n^i - x_{ref}^i]^T S_\infty [x_n^i - x_{ref}^i]$. If $S_\infty$ is replaced with an identity matrix, the result decreases to a Euclidean distance. However, the reduction in distance does not always result in an increase in the degree of ease of reaching targets. For example, although fishes 4 and 5 are near the targets, they have to change their direction of motion into a lateral direction to reach the targets. Note that updating of $\pi_n$ is performed in a rather shortsighted fashion and the best option is immediately employed.

(A-5) Algorithm

An example of a novel algorithm for achieving coordination at run time according to the present invention is shown below. This example of the algorithm has a high responsiveness and may be performed in real time. Furthermore, at the design stage, the optimum feedback rule is determined from the characteristics of the dynamic system according to the evaluation criteria using an off-line algorithm including a procedure widely used to solve the LQ problem. This will be discussed in further detail later in Section (A-8).

RUN-TIME COORDINATION ALGORITHM (A1)

Exert Continuous Multivariable Controls
  (Role Assignments Defined by $\pi_n$)
1. $U_n \leftarrow -G[X_n - \pi_n \cdot X_{ref}]$
Dynamic Simulation Step
2. $X_{n+1} \leftarrow f(X_n, U_n)$
3. $J \leftarrow (X_n - \pi_n \cdot X_{ref})^T S (X_n - \pi_n \cdot X_{ref})$
Sort Entities According to their Contribution to Overall Cost
4. For each entity j do
5. $X_n^{-j} \leftarrow [X_n^1, X_n^2, \ldots, j^{th}$ coordinated of $(\pi_n X_{ref}, \ldots, X_n^N]$
6. $J_j(n) \leftarrow (X_n^{-j} - \pi_n, X_{ref})^T S (X_n^{-j} - \pi_n, X_{ref})$
7. Endfor
8. Sort entities by decreasing $J_j(n)$
Look for Opportunistic Role Swaps in K Worst Performers
9. For K! permutations $\pi(k)$ of K candidates do
10. $J(\pi(k)) \leftarrow (X_n - \pi(k) \cdot X_{ref})^T S (X_n - \pi(k) \cdot X_{ref})$
11. if $(J^* > |J(\pi(k)) + \Delta_{min}|)$ then
12. $J^* \leftarrow J(\pi(k))$
13. $k^* \leftarrow k$
14. endif
15. endfor
Update Role Assignments Switchboard
16. $\pi_{n+1} \leftarrow \pi(k)^*$

-----------------------------------

1. Feed-forward gains (or integral terms) ensure disturbance rejection.
2. Threshold prevents flickering due to non-linear dynamics.
3. Permutations are computed beforehand (see offline algorithm in Section (A-8)).
4. Role assignment is represented by matrix ft for convenience, yet implementation relies on a simple indirection rather than matrix multiplication.

The algorithm shown above is applied for each time step. The calculation efficiency of the algorithm may be increased by various methods including a clustering technique used in a simulation of a many-body (n-body) problem or a method adapted to characteristics intrinsic to a particular case. Although a matrix representation is employed, the matrix representation is not always efficient.

Because the complexity of the role assignment increases as the factorial of the number of members, the above algorithm cannot be scaled up unless the role replacement is limited to a small subgroup.

In essence, K members having the lowest performance (worst performers) and thus having a large influence upon the overall performance index J are tracked so that when an opportunity for role replacement is found, role replacement is performed among those worst performers, thereby reducing the calculation load from N! to K! (K<N or X<<N). When the calculation is performed in real time, K generally has a small value such as 6. For example, K and N may be set such that K=7 and N=100. When N is small, an initial sorting process is skipped, and thus a corresponding overhead is eliminated.

(A-5–1) Modification Associated with Independent Member Dynamics

When coupling among members is negligible, separate optimum controllers (which may be obtained by means of LQ synthesis) are used for the respective members (j). The contribution to the overall performance is given by $J(j) = [X_n^j - (\pi_n \cdot X_{ref})^j]^T S^{entity}[X_n^j - (\pi_n \cdot X_{ref})^j]$ where $(\pi_n \cdot X_{ref})^j$ represents the jth coordinate of the current reference vector $\pi_n \cdot X_{ref}$. Note that the role assignment and the layout are maintained at $\pi_n$ and $X_{ref}$, respectively. By comparing not the absolute cost but the derivative thereof and employing factorization in the calculation, the complexity of J is reduced from $O(N^2)$ to $O(N)$.

(A-5–2) Convergence Analysis

The control theory includes a tool for evaluating the dynamic behaviors. This tool is useful to check whether the specified layout is maintained. If the dynamic characteristics based on which the control is performed are linear, it is possible to obtain formal proof of convergence from the essential stability of the LQ control (F. Franklin, J. D. Powell, and M. Workman, "Digital Control of Dynamic Systems", Addison Wesley, 1998). According to Liapunov's method (J. La Salle, J., and S. Leffschetz, "Stability by Liapunov's Direct Method", Academic Press, New York, 1961), the system is globally stable when the Liapunov function satisfies the following conditions:

1. $V(X_n)$ is continuous and positive.
2. $V(X_n)$ decreases with time.
3. There is a function of $(X_n)$ which satisfies the following conditions:
   (a) $0 < (\|X_n\|) < V(X_n)$
   (b) $\lim (\|X_n\|) = \infty$ when $\|X_n\| \to \infty$ Because the stability of the LQ problem is ensured (G. F. Franklin, J. D. Powell, and M. Workman, "Digital Control of Dynamic Systems", Addison Wesley, 1998), a Liapunov function $V(X_n) = X_n^T S_\infty X_n$ which satisfies the conditions 1 and 3 described above is selected.

$$\Delta V = V(X_{n+1}) - V(X_n) \quad (11)$$

$$= X_{n+1}^T S_\infty X_{n+1} - X_n^T S_\infty X_n$$

$$= X_n^T [A - BG]^T S_\infty [A - BG] X_n - X_n^T S_\infty X_n$$

Herein, $S_\infty = A^T[S_\infty - S_{n+1}B(R + B^T S_{n+1} B)^{-1} B^T S_{n+1}]A + Q$, and thus $V = -X_n^T[Q + G^T RG]X_n$. Herein, $[Q + G^T RG]$ is positive and finite, hence $V < 0$. This ensures the stability. That is, when assigned roles are fixed, convergence toward the designated layout is assured. In the present case, the replacement of roles (permutation $\pi_n$) provides an opportunity for a further reduction in the calculation load, and thus the convergence is accelerated.

$$V(\pi_n X_{n+1}) < V(X_{n+1}) \to V(\pi_n X_{n+1}) - V(X_{n+1}) < 0 \quad (12)$$

Equation 12 indicates that the gain can be further increased by optimizing the time sequence $\{\pi_0, \ldots, \pi_n, \pi_{n+1}, \ldots, \pi_\infty\}$ associated with the assigned roles. Herein, an instantaneous optimum choice (which may be less optimum than the really optimum choice because of the shortsighted approach) is employed taking into account the application. Furthermore, complex switching is prevented using a threshold value $\Delta_{min}$ (a recent discussion on the effect of switching rules upon the stability can be found in D. Liberzon and A. Morese, "Basic Problems in Stability and Design of Switched Systems", IEEE Control Systems Magazine, October 1999).

Figure 6A:
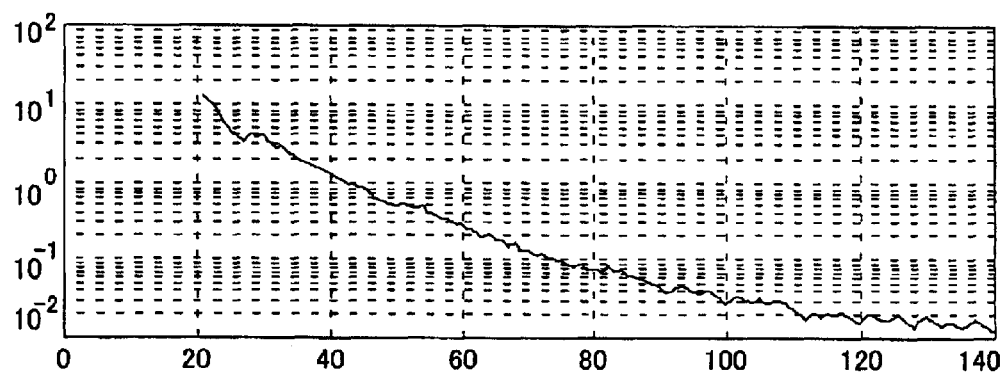
FIG. 6A is a graph illustrating the performance index of a system according to the present invention as a function of the frame number, which corresponds to the elapsed time.
Figure 6B:
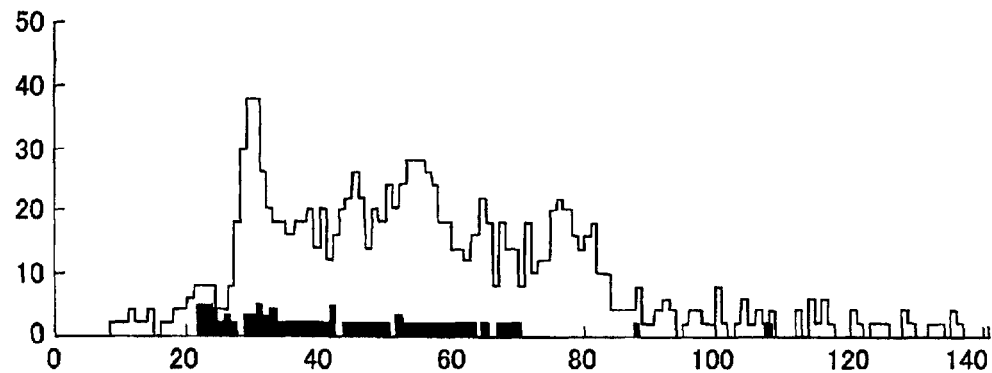
FIG. 6B is a graph illustrating the number of local interactions in the system according to the present invention as a function of the frame number, which corresponds to the elapsed time.

Although Liapunov's method can be applied to nonlinear dynamics, the execution thereof is complicated and it is necessary to perform a computer simulation to check whether the algorithm is trapped. FIG. 6A is a graph showing the performance index, and FIG. 6B is a graph showing the number of local interactions. In FIG. 6B showing the number of local interactions, open bars represent the number of collisions and solid bars represent the number of role replacements. In both FIGS. 6A and 6B, the horizontal axis represents the frame number which corresponds to the elapsed time. It can be seen from FIGS. 6A and 6B that the number of collisions and the performance index both decrease with increasing frame number and with increasing number of role replacements.

(A-5-3) Real-Time Performance

The algorithm (A1, above; and A2, below according to the present invention has been evaluated in terms of the stability and the calculation load impose upon a game under the conditions of a frame rate of 50 Hz and a peak number of instructions of the order of GFLOPS/sec (FIG. 7). The algorithm has been executed on the PlayStation 2 produced by Sony Computer Entertainment, Inc. It has been assumed that the CPU time spent for the processing associated with the dynamic characteristics and the coordination is very short (of the order 1% of the total CPU time), and the number of members whose roles were replaced was limited to K=6. When the number N of members is small, the processing associated with the coordination and the processing associated with the dynamic characteristic need similar calculation loads. However, the processing associated with the coordination becomes dominant when N is large.

The algorithm A2 shown below is an example of an algorithm of a version optimized in terms of the block diagonal system. The algorithm A2 shown below has better linear characteristics than the algorithm A1 shown in Section (A-5), because the core matrices $S_\infty$, A, B, and G in the algorithm A2 increase in size linearly as N increases, while they increase in size quadratically in the algorithm A1.

OPTIMIZED VERSION FOR BLOCK-DIAGONAL SYSTEMS (A2)

1. $U_n \leftarrow -G[X_n - \pi_n \cdot X_{ref}]$
2. $X_{n+1} \leftarrow f(X_n, U_n)$
3. For j=1 to N do
4. $\delta J(i,j) \leftarrow [X_n^j - (\pi_n \cdot X_{ref})^j]^T S^{entity} [X_n^j - (\pi_n \cdot X_{ref})^j]$
5. endfor
6. Sort entities by decreasing $\delta J(i,I)$ & select first K ones
7. for k=1 to K do
8. for p=k to K do
9. $\delta J(k,p,) \leftarrow [X_n^K - X_{ref}^P]^T S^{entity}[X_n^K - X_{ref}^P]$
10. endfor
11. endfor
Look for Opportunistic Role Swaps in K worst performer
12. For K! permutations $\pi(k)$ of K candidates do
13. $J(\pi(k)) \leftarrow \sum_{p=0}^N \delta J(p, -X_{ref}(p, \pi(k))$ or target $(p, \pi(k))$
14. if $(J^* > |J(\pi(k)) + \Delta_{min}|)$ then
15. $J^* \leftarrow J(\pi)k))$
16. $k^* \leftarrow k$
17. endif
18. endfor
19. $\pi_{n+1} \leftarrow \pi(k^*)$ (1) Sorting candidates for role swapping on a simple distance-to-target criterion corresponds to replacing Sentity by the identity matrix.

The discrete part in the coordination process in the algorithm A2 may be treated as an ordinal assignment problem according to a technique known in the art of operational research. For example, when K becomes large, a streamlined version of the simplex method (linear programming) known as the transportation simplex method or a known algorithm developed for assignment problems in the art of operational research may be employed, instead of the above-described process of replacing roles using a permutation table.

(A-6) Practical Use of the Algorithm

In order to employ the theory according to the present invention in practical applications, various associated techniques including a modeling technique, a simulation technique, a content authoring tool, a run-time engine, etc., have been developed. The developed prototype is based on the run-time codes of Matlab, Maya, and PlayStation 2.

(A-6-1) Discussion on Nonlinearity

The efficiency of the coordination process depends upon the nonlinearity, that is, upon whether the dynamic model, which would be built manually in the conventional technique, can be well processed using linear feedback, because global optimization is assured only for linear dynamic characteristics.

The computerization of such a task is not easy, and specialized knowledge about dynamic characteristics is required. Some practical guidelines are presented below.

(A-6-1-1) Neglecting Nonlinearity

By way of example, an animation of a group including 50 members (bees) is described. In this example, the bees in the group behave as a group (have linear attraction), while they behave repulsively when they come very close to each other (that is, there is nonlinearity and the Newton's law of collision holds). One scene of an animation of the group of bees is shown in FIG. 8.

Figure 8:
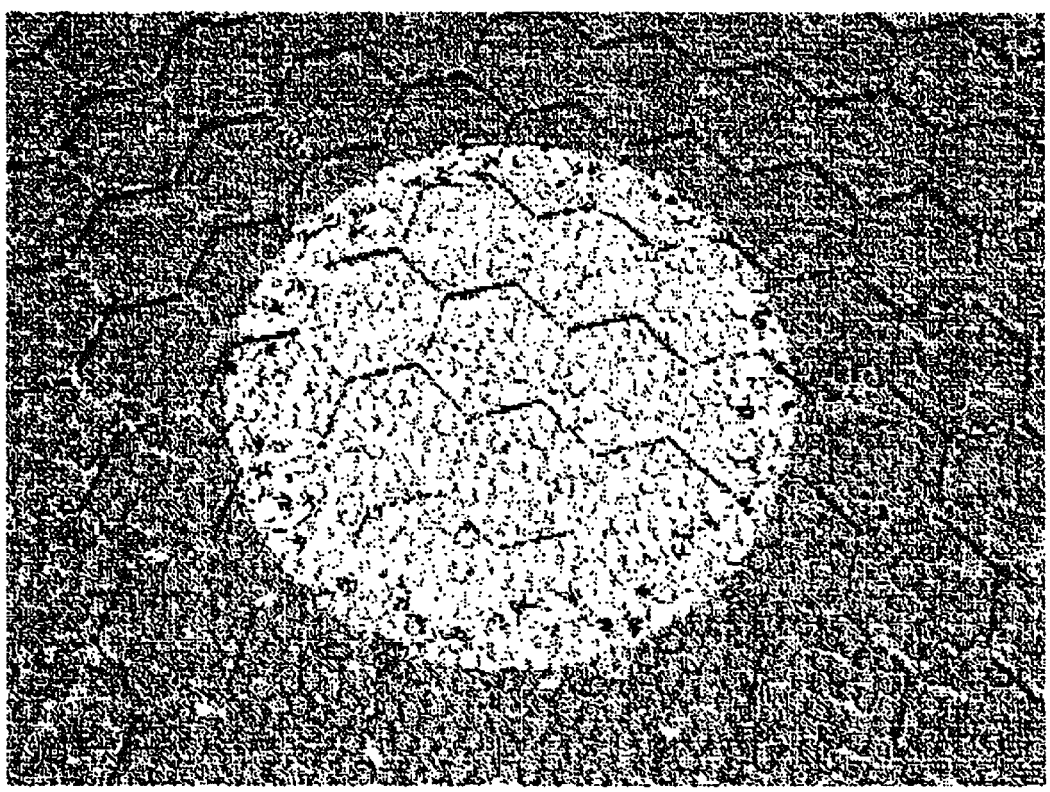
FIG. 8 is a schematic diagram illustrating one scene of an animation of a group of bees produced according to the present invention.

In FIG. 8, 50 bees gather within a particular region below light. Although a dynamic model employed herein is not a mechanical model employed in many other cases, the dynamic model employed allows suppression of acceleration of expansion of members. Thus, a certain systematic group behavior is described by this dynamic model.

Figure 9:
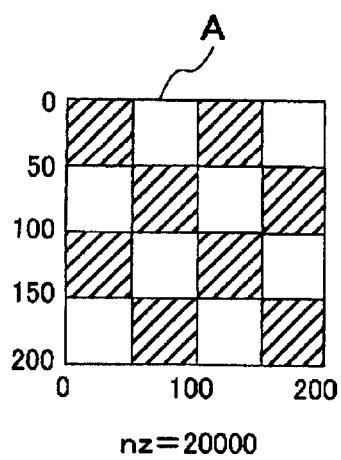
FIG. 9 illustrates examples of matrices used to generate the animation shown in FIG. 8.
Figure 9:
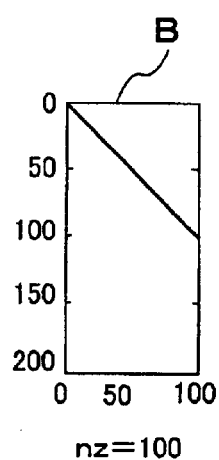
Figure 9:
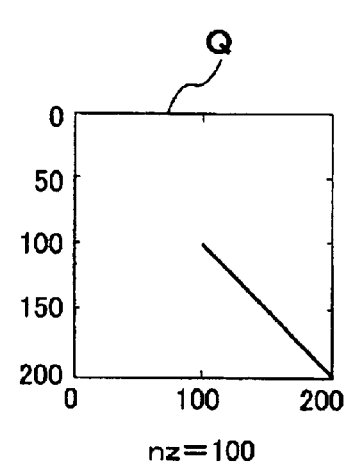
Figure 9:
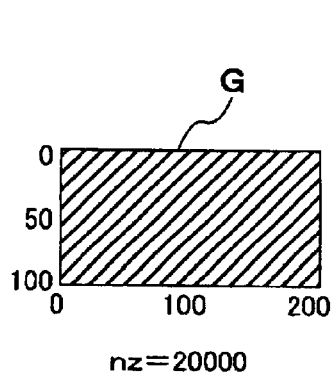
Figure 9:
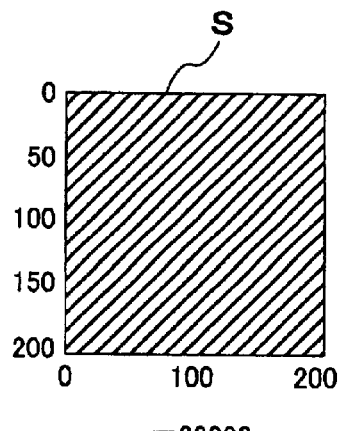
Figure 9:
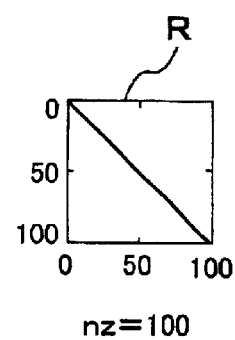

The system equation is given as $X_{n+1} = AX_n + BU_n + (X_n)$. Matrices such as those illustrated conceptually in FIG. 9 are required for the calculation according to the algorithm A1. In FIG. 9, the matrix G is used to provide inputs of members and the matrix S is used to determine the cost (performance index) such as a simple distance. In FIG. 9, non-zero elements in the matrices are represented by shaded areas, and zero elements are represented by open areas. For a group which includes a large number of members, as is the case with the present A group of bees, the calculation load associated with the multivariable feedback becomes greater than that of the simulation. This can also be seen from comparison between the sizes of matrices A and B and the sizes of matrices G and $S_{28}$.

For the compensation of the group behavior (for a constant disturbance), a feedforward gain (D. Powell and M. Workman, "Digital Control of Dynamic Systems", Addison Wesley, 1998) is used. First, the optimum feedback is designed from A, B, Q, and R on the basis of the LQ synthesis. The effects thereof are then evaluated by means of a simulation.

As shown in FIG. 6 although the group is collapsed at an initial stage, bees gradually gather into a specified form after a layout is applied when the frame number=21. In the present example, the number of role replacements is limited to 6 for each frame. Because the replacement of roles needs a finite period of time, a greater number of members of the group can be involved in practice. In spite of collisions, the group of bees forms a specified shape.

(A-6-1-2) Deductive Approach to Preventing Nonlinearity

A second example is now shown to discuss a group of airplanes having nonlinear characteristics. To handle the present problem, linearity is forcedly introduced by using a Jacobian which linearly simulates the dynamic behavior around a certain operating point in a state space. Upon the assumption that airplanes fly in formation at a substantially constant speed, the Jacobian of the system is extracted:

$$\delta X_{n+1} = (\partial f/\partial X)_0 \delta X_n + (\partial f/\partial U)_0 \delta U_n = A \delta X_n + B \delta U_n \quad (13)$$

Figure 10A:
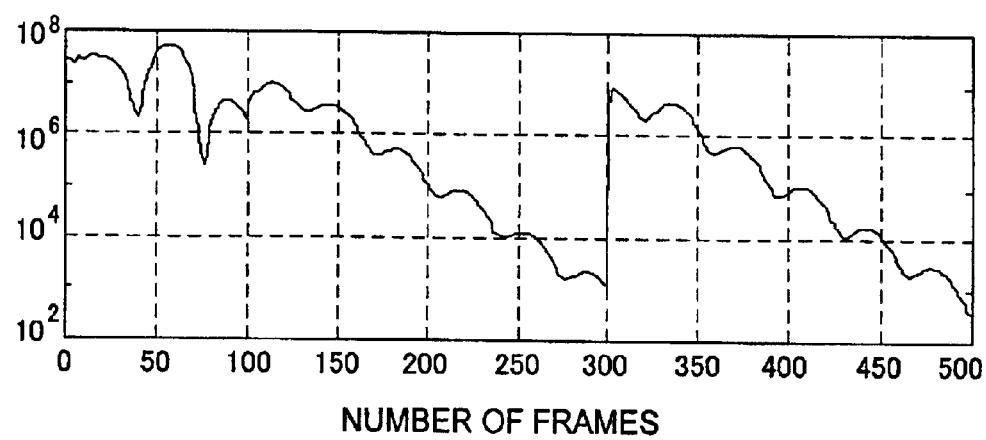
FIG. 10A is a graph illustrating the evaluation function (optimal cost) for another example of an animation as a function of the frame number.
Figure 10B:
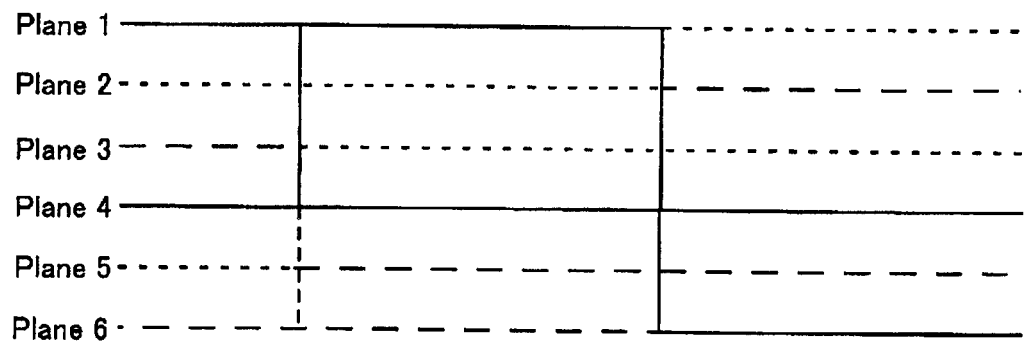
FIG. 10B is a timing chart illustrating the changes in the state space in terms of the roles assigned to six airplanes contained in an formation of airplanes used in the example shown in FIG. 10A.

FIG. 10A is a graph illustrating the evaluation function (optimal cost) for the present example as a function of the frame number. FIG. 10B is a timing chart illustrating the changes in the state space in terms of the roles assigned to six airplanes contained in the airplane formation of the present example. In the present example, the control rule is calculated upon the assumption that airplanes fly in formation and an operating point is obtained near the point at which the Jacobian of the system is extracted. The layout is changed at frame number=100 and also at frame number=200 thereby triggering the replacement of roles among airplanes.

As can be seen from FIG. 10, when the nonlinearity is not very strong, as is the case in the present example, the performance index generally reduces. The threshold value is reduced to about 30% in order to avoid flicker and sporadic replacement of roles.

(A-6-1-3) Inevitable Handling of Nonlinearity

A third example is now presented to discuss a group consisting of six fishes, having (I) caudal fins providing a propulsive force, (II) a nonlinear combination of state variables in a hydrodynamic system, and (III) a plurality of nonlinearities caused by conditioned responses to avoid collisions.

When fishes of the group move against the flow of water, an operating point is presented. The Jacobian is extracted in the vicinity of the operating point. The caudal fins are moved in response to an impulse train triggered by a negative-phase signal output by a clock generator. The motion of the caudal fins ($F^+$, $F^-$) can be controlled over each time-average driving cycle, as pointed out by Nougaret et al (J. I. Nougaret, B. Arnaldi, and F. Multon, "Coarse to Fine Design of Feedback Controllers for Dynamic Locomotion", Visual Computer, 4(10), 1997).

Figure 11A:
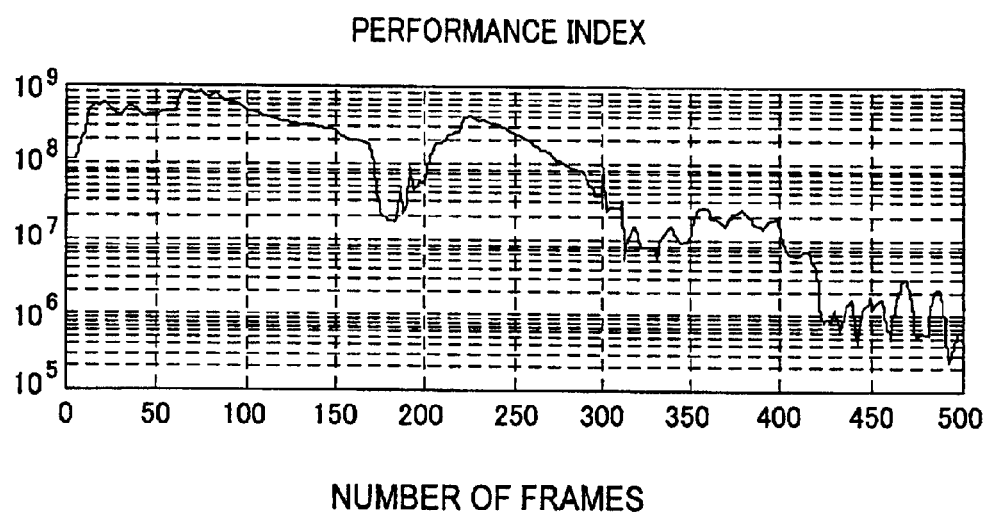
FIG. 11A is a graph illustrating the performance index associated with another example of an animation according to the present invention as a function of the frame number.

The nonlinearities cause the state-space trajectories of fishes of the group to become complicated, as shown in FIG. 11, and the algorithm functions in a manner which is very different from the predicted manner.

Figure 11B:
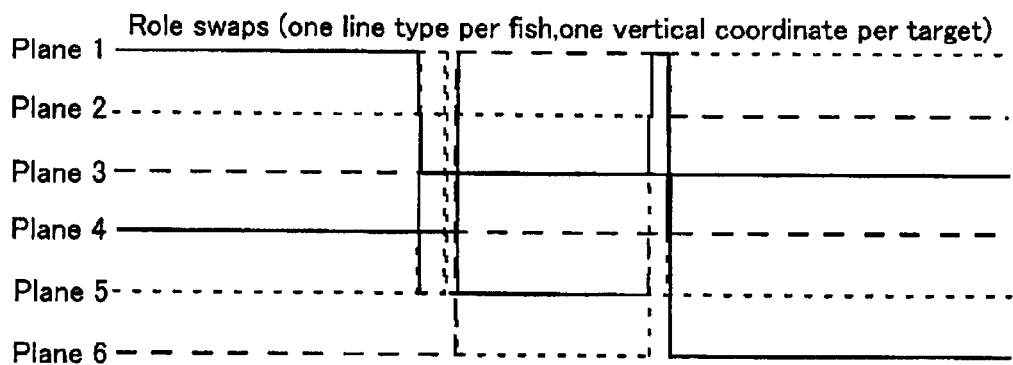
FIG. 11B is a timing chart illustrating the changes in the state space in terms of the roles assigned to six fishes contained in a group used in the example shown in FIG. 11A.

FIG. 11 illustrates the performance index in the present example as a function of the frame number. FIG. 11B is a timing chart illustrating the changes in the state space in terms of the roles assigned to six fishes contained in the group in the present example, wherein lines represent respective fishes and the vertical coordinate represents targets. When there is strong nonlinearity as is the case in the present example, the performance index decreases in a random fashion. For example, replacement of roles is triggered by a change in the layout at frame number=300. Spontaneous replacement of roles occurs near frame number=200.

In some cases, the intrinsic dynamic characteristics preclude the above-described motion or global searching is essentially required. In such a case, it often becomes impossible to reach the specified layout. In order to adjust the performance of the algorithm to avoid the above problem, it is necessary to perform a numerical simulation which needs a very large number of calculations.

$$X_{n+1} = \begin{bmatrix} v_{n+1}^i \\ v_{n+1}^j \\ \omega_{n+1} \\ x_{n+1} \\ y_{n+1} \\ \psi_{n+1} \end{bmatrix} = f(X_n, U_n) \quad (14)$$

$$= \begin{bmatrix} 0.7071 & 7.7071 \\ 0.7071 & -0.7071 \\ 7.7000 & -7.7000 \\ 0 & 0 \\ 0 & 0 \\ 0 & 0 \end{bmatrix} \begin{bmatrix} F^+ \\ F^- \end{bmatrix} +$$

$$\begin{bmatrix} 0.9720 & +0.4\omega_n & 0 & 0 & 0 & 0 \\ -0.4\omega_n & 0.9640 & 0 & 0 & 0 & 0 \\ 0 & 0 & 0.72 & 0 & 0 & 0 \\ 0.4\cos\psi_n & -0.4\sin\psi_n & 0 & 1 & 0 & 0 \\ 0.4\sin\psi_n & 0.4\cos\psi_n & 0 & 0 & 1 & 0 \\ 0 & 0 & 0.4 & 0 & 0 & 1 \end{bmatrix} \begin{bmatrix} v_n^i \\ v_n^j \\ \omega_n \\ x_n \\ y_n \\ \psi_n \end{bmatrix}$$

$$Q = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0.5 & 0 & 0 \\ 0 & 0 & 0 & 0 & 2.5 & 0 \\ 0 & 0 & 0 & 0 & 0 & 1.5 \end{bmatrix} \quad R = \begin{bmatrix} 0.99 & 0 \\ 0 & 0.99 \end{bmatrix} \quad (15)$$

$$A = \left.\frac{\partial f}{\partial X}\right|_0 = \begin{bmatrix} 0.972 & 0 & 0 & 0 & 0 & 0 \\ 0 & 0.962 & 0 & 0 & 0 & 0 \\ 0 & 0 & 0.720 & 0 & 0 & 0 \\ 0.4 & 0 & 0 & 1.000 & 0 & 0 \\ 0 & 0.4 & 0 & 0 & 1.000 & 0 \\ 0 & 0 & 0.4 & 0 & 0 & 1000 \end{bmatrix} \quad (16)$$

$$B = \left.\frac{\partial f}{\partial U}\right|_0 = \begin{bmatrix} 0.7071 & 0.7071 \\ 0.7071 & -0.7071 \\ 7.7000 & -7.7000 \\ 0 & 0 \\ 0 & 0 \\ 0 & 0 \end{bmatrix}$$

$$G = \begin{bmatrix} 0.1503 & 0.2324 & 0.0293 & 0.4516 & 0.4902 & 0.4118 \\ 0.1503 & -0.2324 & -0.0293 & 0.4516 & -0.4902 & -0.4118 \end{bmatrix} \quad (17)$$

$$S_x = \begin{bmatrix} 0 & 0 & 0 & 0 & 0 & 0 \\ 0 & 4.1197 & -0.3783 & 0 & 3.7078 & -2.6483 \\ 0 & -0.3783 & 0.0347 & 0 & -0.3405 & 0.2432 \\ 0 & 0 & 0 & 0 & 0 & 0 \\ 0 & 3.7078 & -0.3405 & 0 & 3.3370 & -2.3834 \\ 0 & -2.6483 & 0.2432 & 0 & -2.3834 & 1.7024 \end{bmatrix} \quad (18)$$

(A-6-2) Limitations and Remaining Problems to be Solved

The algorithm which has been described above with reference to specific examples of applications has been proposed herein in view of the known techniques incapable of efficiently controlling a dynamic group including a plurality of members while maintaining the trajectories in stable states even in the presence of an external disturbance. However, if uncompensated nonlinearity is carelessly introduced into the system, the approach according to the present invention can be defeated. From this point of view, an improvement in the robustness of the system is required.

For example, in the present invention, collisions are avoided in a modest manner by adding a dynamic equation which causes interacting members of the group to be coupled (temporarily). However, J is evaluated without taking into account whether the resultant path includes a collision. If a linear repulsive function are used to avoid collisions, an optimum path including no collisions may be obtained. However, in this case, a reduction in the performance occurs. A layout may be issued in accordance with a sequence so as to reduce the possibility of collisions. However, a numerical simulation is always required to check the convergence and to adjust the threshold parameter $\Delta_{min}$.

When convergence is not assured, the implicit nonlinear dynamics can make reaching the specified layout impossible. A possible eventual means is to try to handle the trajectories at time intervals using a nonlinear optimization algorithm. However, this approach precludes the interactions. Thus, the object to be achieved next is to enhance the robustness of the state feedback by fostering a better understanding of the hybrid system and the robustness thereof. The incorporation of a better collision avoidance rule is also required to enhance the robustness of the algorithm.

(A-7) Conclusions

A technique has been described above for automatically incorporating the control rule analyzing the behavior thereby controlling the group in a coordinated fashion within the framework of optimum feedback. The dynamic characteristics which need continuous feedback for stabilization have also been discussed. However, unfortunately, the approach needs a lot of special knowledge about the dynamics, and thus this technique is not universal.

Thus, in order to release game designers from complicated and troublesome tasks, it is essentially necessary to develop workflows, software tools, and components. It is possible to reduce the calculation load by processing the complicated dynamic characteristics in a sequential or parallel fashion using the concept of the switched system. Finally, planning and arguments of semantic representations of scenes and heuristic approaches will make it possible to improve the role assignment technique.

(A-8) Off-Line Algorithm

At the design stage, the coordination method is described by parameters using a matrix obtained by two off-line algorithms. A first algorithm ("Multivariable LQ Control Synthesis", below calculates the multivariable optimum feedback on the basis of eigenvector expansion and solves the ARE (standard algorithm in LQ synthesis)

MULTIVARIABLE LQ CONTROL SYSTHESIS

1. Given the dynamic system A, B and performance index matrices Q, R, form the Hamiltonian matrix defined as:

$$H = \begin{bmatrix} B + AR^{-1}B^T A^{-T} Q & -BR^{-1}B^T A^{-T} \\ -A^{-T}Q & A^{-T} \end{bmatrix}$$

2. Complete eigenvalues $\lambda$ and eigenvectors W of H, collecting all couples such that the eigenvalues's modulus is smaller than one (stable pole of the closed-loop system)
3. Compute $S=\lambda W^{-1}$
4. Compute the optimal matrix K Gain as $$G=[R+B^T SB]^{-1} B^T SA$$

The second off-line algorithm ("Function PermutationArray=Permute (vector)", below) recursively generates K! permutations and stores them in advance. These calculation results are sequentially used at run time to evaluate the role replacement. When K=7, the number of entries of the table becomes 4,320. The permutation algorithm is described in R. Grimaldi, "Discrete an Combinational Mathematics", Addison-Wesley, New York 1999.

Function PermutationArray=Permute (vector)
1. n=length (vector)
2. if(n==1) then
3. PermutationArray=vector
4. else
5. PermutationArray=NULL array
6. Height=0
7. for k=1 to n do
8. sub-vector (k)=ShrinkVector (vector, k)
9. SubArray=Permute (sub-vector)
10. for i=1 to (n−1)! do
11. for j=1 to n−1 do
12. PermutationArray [i+Height][j]=SubArray [i][j]
13. endfor
14. PermutationArray [i+Height][n]=vector [k]
15. endfor
16. Height=Height+(n+1)!
17. endfor
18. endif
19. return PermutationArray (B) Entertainment Apparatus An embodiment of an entertainment apparatus using an animation generated by the control method according to the present invention is described below.

(B-1) Functional Block Configuration

Figure 12:
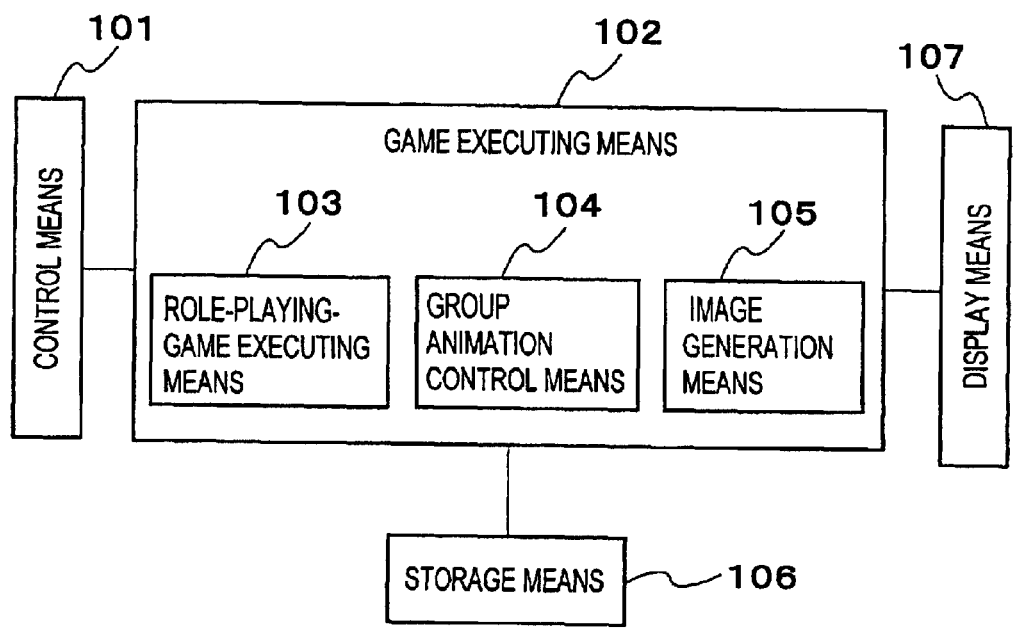
FIG. 12 is a functional block diagram of an entertainment apparatus using a control method according to the present invention.

FIG. 12 illustrates, in functional block diagram form, main parts of the entertainment apparatus of the present embodiment.

In FIG. 12, reference numeral 101 denotes control means used by a game player to input various commands. Command data input via the control means 101 is transmitted to game executing means 102.

The game executing means 102 includes role playing game executing means 103 for executing a game in accordance with a predetermined scenario, group animation control means 104 for producing various groups during the game in accordance with a command given by the game player or in accordance with the scenario and controlling the produced group, and image generation means 105. The game executing means 102 executes the role playing game in accordance with a command given by the game player via the control means 101 and also in accordance with the game program and game data stored in storage means 106. Furthermore, the game executing means 102 produces an image using the image generation means 105 and displays it on display means 107.

The game executing means 102 may be realized with hardware such as a CPU (central processing unit) and a GPU (graphic processing unit). The storage means 106 may be realized with hardware such as a CD-ROM (compact disk-read only memory), a hard disk, memory, or a DVD (digital video disk).

The display means 107 may be realized with a monitor using a CRT (cathode ray tube) or a television set. The display means 107 may be combined together with or separated from the main unit of the video game machine, depending on the type of the game machine, that is, depending upon whether the game machine is for home use or for business use.

Although in the present embodiment, the method of controlling a group animation according to the present invention is applied to the role playing game, the application of the present invention is not limited to such an embodiment. The present invention may be applied to various games in which a group including a plurality of members appears, if the dynamic characteristics of the respective members can be represented in an approximate fashion. For example, the present invention may be applied to a war simulation game and a race simulation game in which groups of human begins and groups of machines appear in various forms and move, and a game including artificial organisms simulating natural organisms which gather into a group and behave as a group.

(B-2) Hardware Configuration

An example of the appearance and an example of the general hardware configuration of the entertainment apparatus of the present embodiment are described below with reference to FIGS. 13 and 14.

Figure 13:
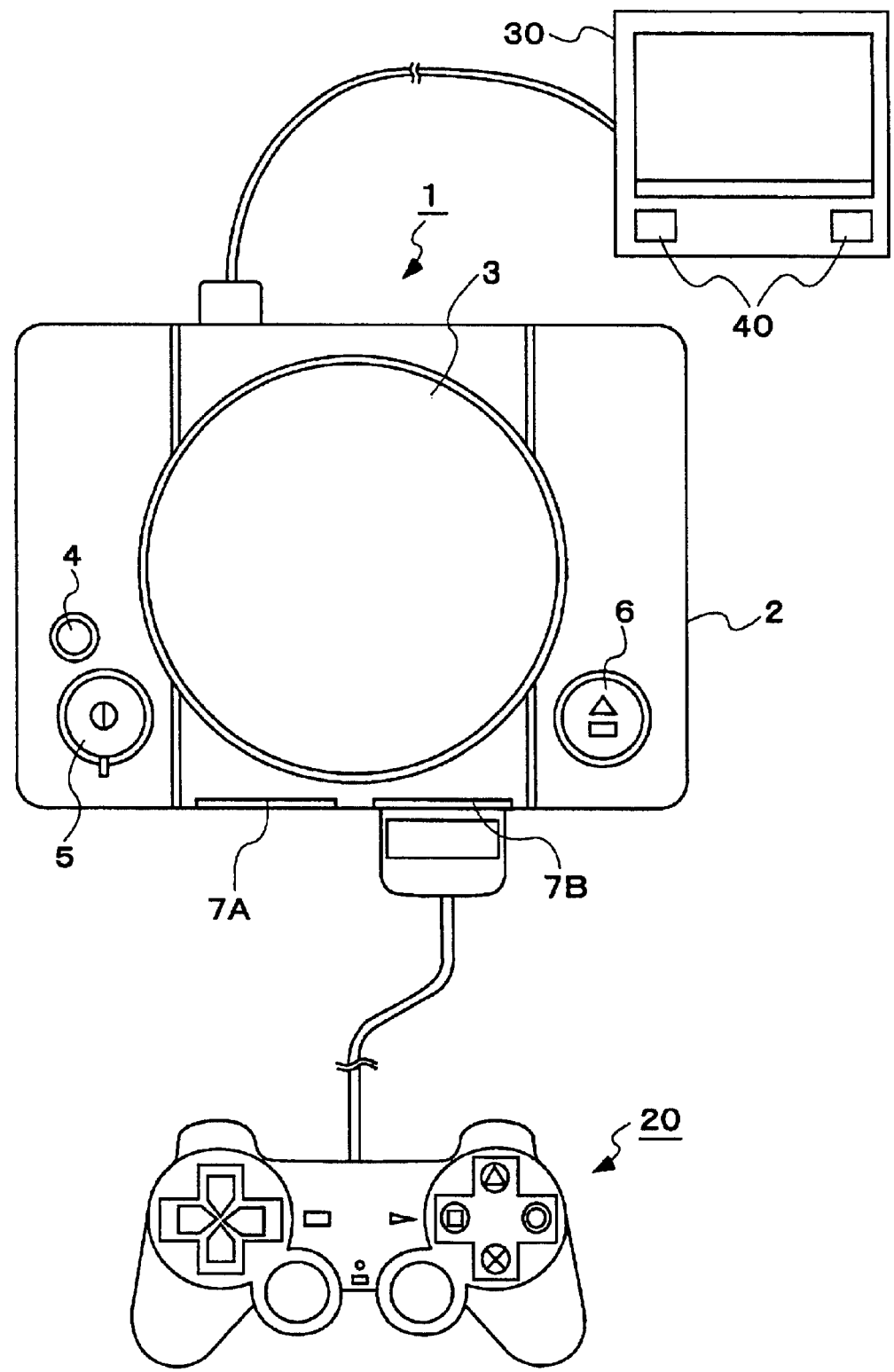
FIG. 13 is a schematic diagram illustrating an example of the hardware configuration of an entertainment apparatus using the control method according to the present invention.

FIG. 13 illustrates an example of the appearance of the entertainment apparatus. The entertainment apparatus 1 reads a game program stored on an optical disk such as CD-ROM and executes it in response to an operation performed by a game player.

The main unit 2 of the entertainment apparatus 1 includes a disk loading part 3 in which an optical disk on which a game program is stored is loaded, a reset switch 4 for resetting the game, a power switch 5, a disk control switch 6 for controlling the loading of the optical disk, and slots 7A and 7B (two slots in this specific example).

The slots 7A and 7B are used to connect a controller 20. The slots 7A and 7B may also be used to connect a memory card so that game data is stored to or read from it.

The entertainment apparatus 1 is connected to a monitor 30 and loudspeakers 40, although connecting parts are not shown in FIG. 13. In the example shown in FIG. 13, a television set is used as the monitor 30 and also as the loudspeakers 40.

Figure 14:
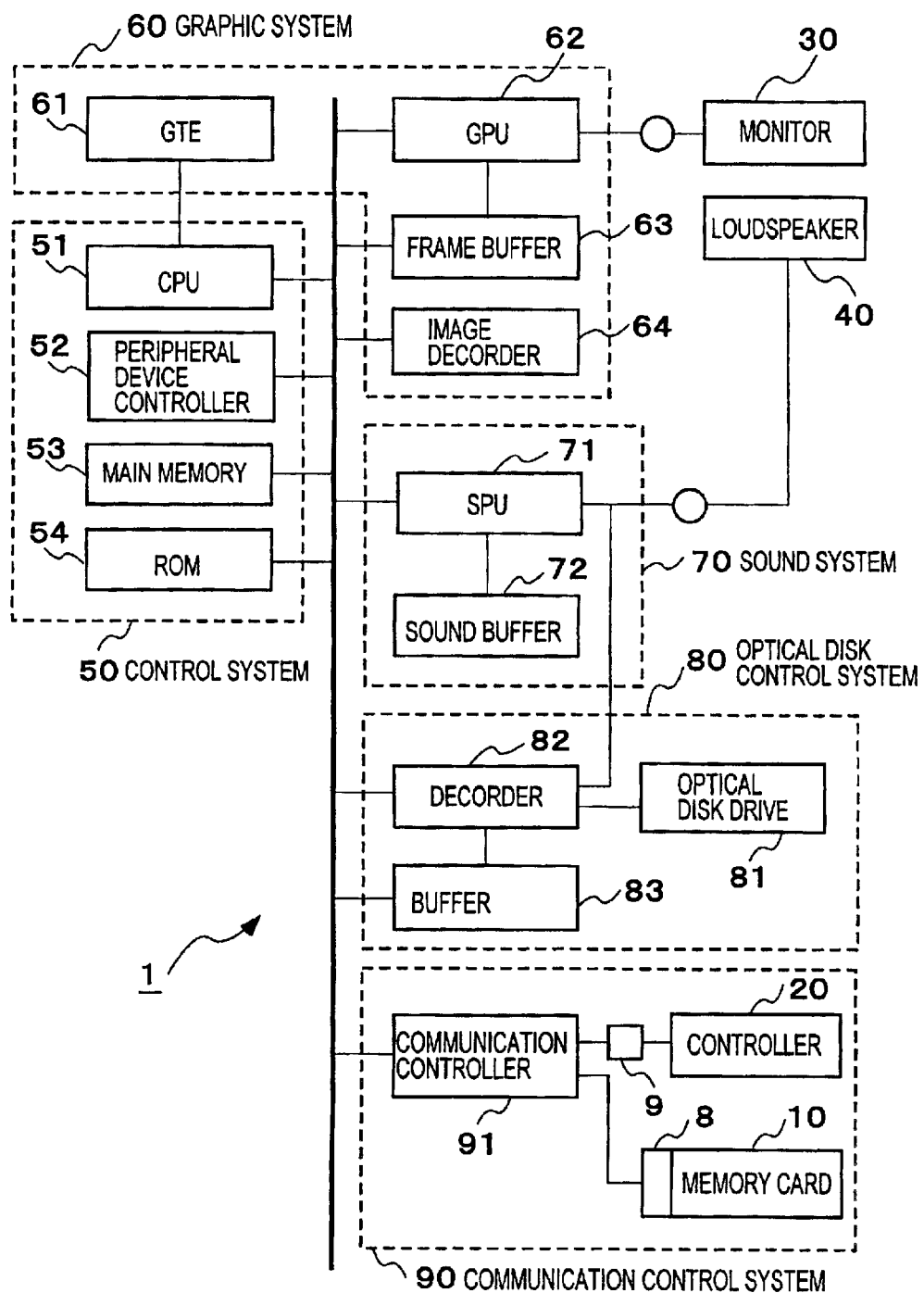
FIG. 14 is a circuit diagram illustrating an example of a circuit configuration of the entertainment apparatus using the control method according to the present invention.

FIG. 14 illustrates the general hardware configuration of the entertainment apparatus 1. As shown in FIG. 14, the entertainment apparatus 1 includes a control system 50 including a CPU 51 and associated peripheral devices, a graphic system 60 including a GPU 62 which writes an image into a frame buffer 63, a sound system 70 including an SPU (sound processing unit) 71 for producing musical sounds or sound effects, an optical disk control system 80 for controlling the optical disk on which the game program is stored, and a communication control system 90 for controlling the inputting of a signal output by the controller 20 in response to a command given by a game player and also for controlling the inputting/outputting of data to/from a memory card 10 in which settings of the game or the like are stored.

In FIG. 14, the control system 50 includes the CPU 51, a peripheral device controller 52 for controlling interrupt handling and direct memory access transfer operations, a random access memory (RAM) serving as a main memory 53, and a read only memory (ROM) 54 in which is stored an operating system (OS) for controlling various parts such as the main memory 53, the graphic system 60, and the sound system 70.

When electric power is turned on, the CPU 51 executes the operating system stored in the ROM 54 so as to control the entire entertainment apparatus 1 including the graphic system 60, the sound system 70, etc.

After executing the OS, the CPU 51 performs initialization and checks whether various parts work correctly. The CPU 51 then controls the optical disk control system 80 and executes the game program stored on the optical disk.

During the execution of the game program, in response to a command given by the game player, the CPU 51 controls the graphic system 60 and the sound system 70 so as to display an image and generate a sound such as musical sounds or sound effects.

In FIG. 14, the graphic system 60 includes a GTE (geometry transfer engine) 61 for performing a process such as a coordinate conversion, a GPU 62 for writing an image in accordance with an image write command given by the CPU 51, a frame buffer 63 for storing the image written by the GPU 62, and an image decoder 64 for decoding image data coded in a compressed fashion.

The GTE 61 has a parallel processing capability for performing a plurality of calculations in parallel. This allows the GTE 62 to perform, at a high speed, various calculations including a coordinate transformation, a perspective transformation, and lighting calculations in response to calculation commands given by the CPU 51. The GPU 62 writes an image composed of polygons into the frame buffer 63 according to an image write command given by the CPU 51.

The frame buffer 63 is composed of a dual port RAM, and is capable of simultaneously reading data to be displayed and storing an image written by the GPU 62 or transferring data from the main memory. The frame buffer 63 includes a display area for storing video data to be displayed on the monitor 30. The frame buffer 63 further includes a CLUT area for storing a color look-up table (CLUT) which is referred to when the GPU 62 writes a polygon image, and a texture area for storing texture data which is inserted, after being transformed in terms of coordinates, into polygons written by the GPU 62.

The image decoder 64 decodes, under the control of the CPU 51, image data such as still image data or moving image data stored in the main memory 53 and restores the decoded image data in the main memory 53. The decoded image data may also be stored by the GPU 62 into the frame buffer 63 so as to represent a background image.

In FIG. 14, the sound system 70 includes the SPU 71 for producing sounds such as musical sounds or sound effects in accordance with a command given by the CPU 51, and also includes a sound buffer 72 used by the SPU 71 to store waveform data. The musical sounds or sound effects produced by the SPU 71 is output to the loudspeakers 40. The SPU 72 further has the capability of decoding audio data and also the capability of reproducing, directly or after modulating, waveform data.

In FIG. 14, the optical disk control system 80 includes an optical disk drive 81 for reading the game program or data stored on the optical disk, a decoder 82 for decoding the game program or the data, and a buffer 83 for temporarily storing data read by the optical disk drive 81 thereby allowing data to be read from the optical disk at a higher speed.

Furthermore, in FIG. 14, the communication control system 90 includes a communication controller 91 for controlling the communication with the CPU 51 via a bus. The communication controller 91 includes a controller connecting part 9 for the connection with the controller 20 used by a user to input a command and also includes a memory card insertion part 8 for the connection with the memory card 10 for storing the game settings data or the like.

The controller 20 connected to the controller connection part 9 includes a plurality of control keys used by the game player to input commands. In response to a command from the communication controller 91, the controller 20 transmits control key status data. The communication controller 91 transfers the control key status data received from the controller 20 to the CPU 51. Thus, the command issued by the game player is input to the CPU 51. The CPU 51 performs a process corresponding to the command given by the game player, in accordance with the game program being executed.

When it is required to store the settings data or the like of the game being executed, the CPU 51 transmits the data to be stored to the communication controller 91 which in turn writes the data received from the CPU 51 into the memory card 10 loaded in the slot of the memory card insertion part 8.

One example of the entertainment apparatus and one example of the general hardware configuration thereof have been descried above. However, the present invention is not limited to the details of those. Moreover, the embodiment of the present invention can be carried out not only by the entertainment apparatus but also by a general-purpose information processor.

For example, when a group animation is displayed on the entertainment apparatus using the method of controlling the group animation according to the present invention, a control key for issuing a group-level command to create a group or to specify the form of the group may be disposed, in addition to the usual control keys, on the controller 20.

The method of producing a group animation according to the present invention and the entertainment apparatus using this method have been described above. The present invention may also be employed to control the motion of a system including a plurality of interchangeable members or objects whose dynamic characteristics are simulated.

For example, the present invention may also be applied to a method of controlling a system for simulating a group including a plurality of interchangeable members, the method comprising a continuous processing step for determining the states of the respective members at each time step in accordance with predetermined dynamic characteristics of the respective members; and a discrete processing step for accepting, from the outside, a command specifying the overall state to be achieved for the group and assigning roles to the respective members of the group in accordance with the overall state specified by the command. If new roles are assigned to members in the discrete processing step, the dynamic states of the respective members are adjusted, in the continuous processing step, in accordance with the assigned new roles.

Furthermore, the present invention may also be applied to a method of, in a simulation of a group including N (integer equal to or greater than 2) members, controlling the movement of members of the group so that the members are moved from locations in a predetermined initial layout in a state space to locations in a target layout. This method comprises the steps of:

a) assigning locations in the target layout to the respective members lying at locations in the initial layout so that the members are moved along the shortest distances to the locations in the target layout;

b) moving the members in the initial layout in accordance with the assignments made in step a);

c) calculating the value of a predetermined evaluation function associated with the movements, accomplished in step b), of the respective members to the assigned locations in the target layout;

d) selecting K (integer equal to or smaller than N) members having the greatest values of the evaluation function; and e) replacing the assignments of the locations in the target layout within K! combinations of the selected K members.

After completion of step e), the method returns to step b) so as to perform steps b) to e) repeatedly.

What is claimed is:

1. A method of, in a simulation of a group including N members where N is an integer equal to or greater than 2, controlling the movement of the members of the group so that the members are moved from locations in a predetermined initial layout in a state space to locations in a target layout, said method comprising the steps of:

a) assigning locations in said target layout to the respective members lying at locations in said initial layout so that the members are moved along the shortest distances to the locations in the target layout;

b) moving the members at the locations in said initial layout in accordance with the assignments made in step a);

c) calculating the value of a predetermined evaluation function associated with the movements, accomplished in said step b), of the respective members to the assigned locations in the target layout;

d) selecting K members, where K is an integer smaller than N, having the greatest values of the evaluation function; and e) replacing the assignments of the locations in the target layout in a stable state within K! combinations of only the selected K members, wherein after completion of step e), the method returns to step b) so as to perform steps b) to e) repeatedly.

2. A recording medium readable by an information processor, recording a program for enabling an information processor, in a simulation of a group including N members where N is an integer equal to or greater than 2, to control the movement of the members of the group so that the members are moved from locations in a predetermined initial layout in a state space to locations in a target layout, wherein said program enables the information processor to execute the steps of:

a) assigning locations in said target layout to the respective members lying at locations in said initial layout so that the members are moved along the shortest distances to the locations in the target layout;

b) moving the members at the locations in said initial layout in accordance with the assignments made in step a);

c) calculating the value of a predetermined evaluation function associated with the movements, accomplished in said step b), of the respective members to the assigned locations in the target layout;

d) selecting K members, where K is an integer smaller than N, having the greatest values of the evaluation function; and e) replacing the assignments of the locations in the target layout in a stable state within K! combination of only the selected K members, wherein after completion of step e), the method returns to step b) so as to perform steps b) to e) repeatedly.

\* \* \* \* \*

UNITED STATES PATENT AND TRADEMARK OFFICE
CERTIFICATE OF CORRECTION

PATENT NO. : 6,859,207 B2
DATED : February 22, 2005
INVENTOR(S) : Jean-Luc Nougaret et al.

It is certified that error appears in the above-identified patent and that said Letters Patent is hereby corrected as shown below:

Column 24,
Line 58, please change "combination" to -- combinations --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,859,207 B2
DATED : February 22, 2005
INVENTOR(S) : Jean-Luc Nougaret et al.

It is certified that error appears in the above-identified patent and that said Letters Patent is hereby corrected as shown below:

Title page,
Item [73], Assignee, please change "Assignee: Sony Computer Entertainment Inc., Tokyo (JP)" to -- Assignees: Sony Computer Entertainment Inc., Tokyo (JP); Sony Corporation, Tokyo (JP) --.

Signed and Sealed this

Thirteenth Day of December, 2005

JON W. DUDAS
*Director of the United States Patent and Trademark Office*